(12) United States Patent
Uchishiba et al.

(10) Patent No.: US 12,139,324 B2
(45) Date of Patent: Nov. 12, 2024

(54) RECOVERY APPARATUS AND CONTROL METHOD OF RESOURCE RECOVERY APPARATUS

(71) Applicant: KYOCERA CORPORATION, Kyoto (JP)

(72) Inventors: Hirofumi Uchishiba, Kawasaki (JP); Kazunari Sugihara, Kirishima (JP); Nobuhiko Hachiki, Omihachiman (JP); Ryota Terai, Yokohama (JP); Yuki Suzuki, Yokohama (JP); Ryuta Fujisawa, Kawasaki (JP); Masaya Takahashi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 28 days.

(21) Appl. No.: 18/061,472

(22) Filed: Dec. 4, 2022

(65) Prior Publication Data

US 2023/0108985 A1    Apr. 6, 2023

Related U.S. Application Data

(63) Continuation of application No. PCT/JP2021/020904, filed on Jun. 1, 2021.

(30) Foreign Application Priority Data

Jun. 5, 2020   (JP) .................. 2020-098893
Jun. 29, 2020  (JP) .................. 2020-112194

(51) Int. Cl.
*B65F 1/00*    (2006.01)
*B65F 1/16*    (2006.01)

(52) U.S. Cl.
CPC ............ *B65F 1/004* (2013.01); *B65F 1/1638* (2013.01); *B65F 2001/008* (2013.01); *B65F 2210/138* (2013.01); *B65F 2210/176* (2013.01)

(58) Field of Classification Search
CPC .. B65F 1/004; B65F 1/1638; B65F 2001/008; B65F 2210/138; B65F 2210/176
(Continued)

(56) References Cited

U.S. PATENT DOCUMENTS 6,425,487 B1    7/2002   Emmott et al.
7,328,842 B2    2/2008   Wagner et al.
(Continued)

FOREIGN PATENT DOCUMENTS

CN    107161559 A    9/2017
CN    109987364 A    7/2019
(Continued)

*Primary Examiner* — J. Gregory Pickett
*Assistant Examiner* — Niki M Eloshway
(74) *Attorney, Agent, or Firm* — HAUPTMAN HAM, LLP

(57) ABSTRACT

A resource collection apparatus is an apparatus for collecting waste reusable as a resource. The resource collection apparatus includes an opening associated with a predetermined sorting type, an opening/closing unit configured to open and close the opening, a first detector configured to perform an operation to detect a target waste belonging to a user, and a controller configured to specify a sorting type into which the target waste is to be sorted, by using a result of the detection by the first detector. The controller switches the opening/closing unit from a closed state to an open state when the specified sorting type matches the sorting type associated with the opening.

19 Claims, 14 Drawing Sheets

(58) Field of Classification Search
USPC .................................................... 220/23.83
See application file for complete search history.

(56) References Cited

U.S. PATENT DOCUMENTS

| | | |
|---|---|---|
| 7,336,183 B2 | 2/2008 | Reddy et al. |
| 2003/0034391 A1 | 2/2003 | Wagner et al. |
| 2016/0078414 A1 | 3/2016 | Rathore et al. |
| 2018/0016096 A1* | 1/2018 | Krishnamurthy ......... B65F 1/14 |

FOREIGN PATENT DOCUMENTS

| | | | | |
|---|---|---|---|---|
| CN | 110406839 A | | 11/2019 | |
| CN | 110482076 A | * | 11/2019 | |
| CN | 110654739 A | | 1/2020 | |
| CN | 110697273 A | | 1/2020 | |
| CN | 110817194 A | | 2/2020 | |
| CN | 111071649 A | | 4/2020 | |
| CN | 111661510 A | * | 9/2020 | |
| JP | H6329205 A | | 11/1994 | |
| JP | 2003267509 A | | 9/2003 | |
| JP | 2008168951 A | | 7/2008 | |
| JP | 2009516262 A | | 4/2009 | |
| JP | 201618290 A | | 2/2016 | |
| JP | 2018131287 A | * | 8/2018 | ............... B09B 3/00 |
| WO | WO-2018150657 A1 | * | 8/2018 | ............... B09B 3/00 |

* cited by examiner

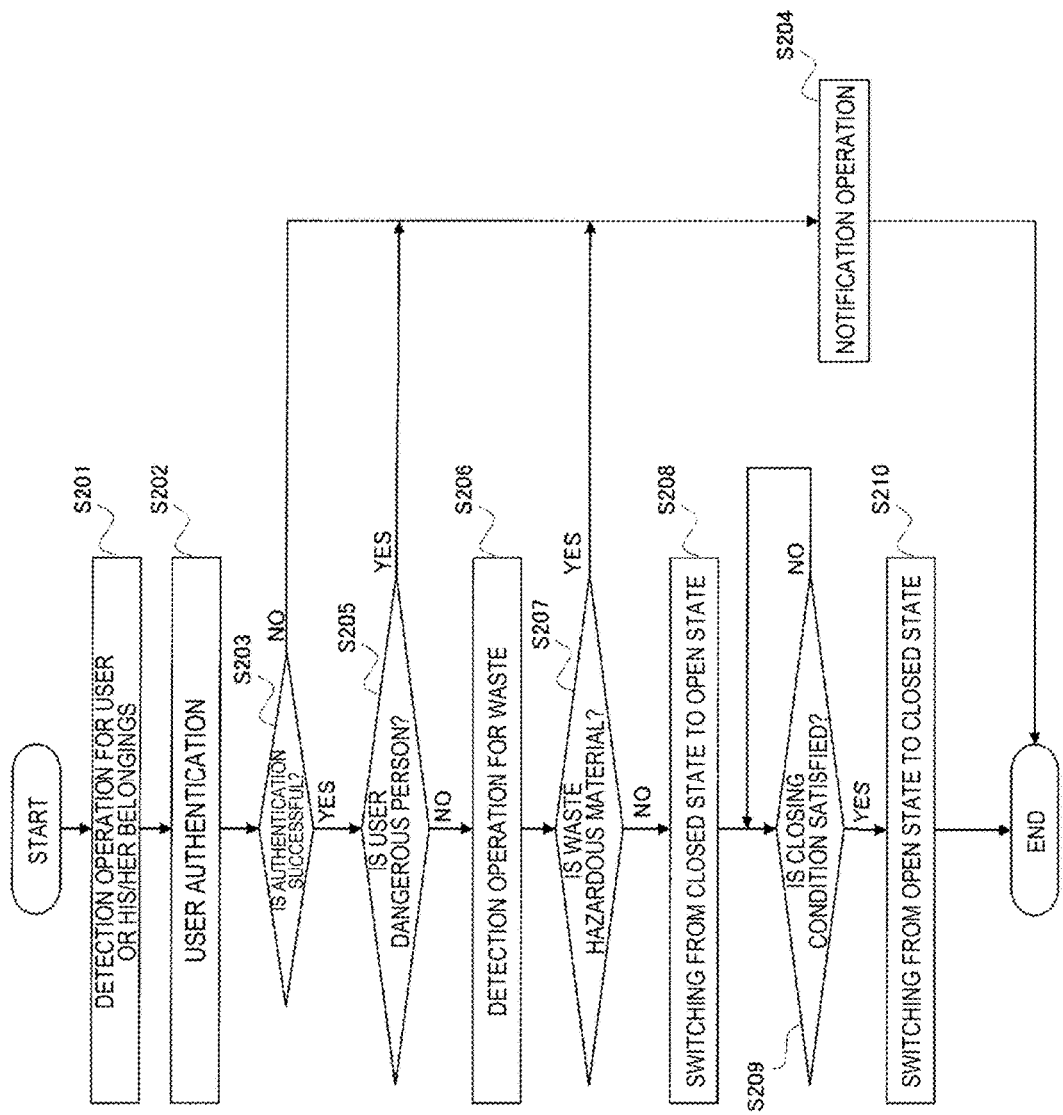

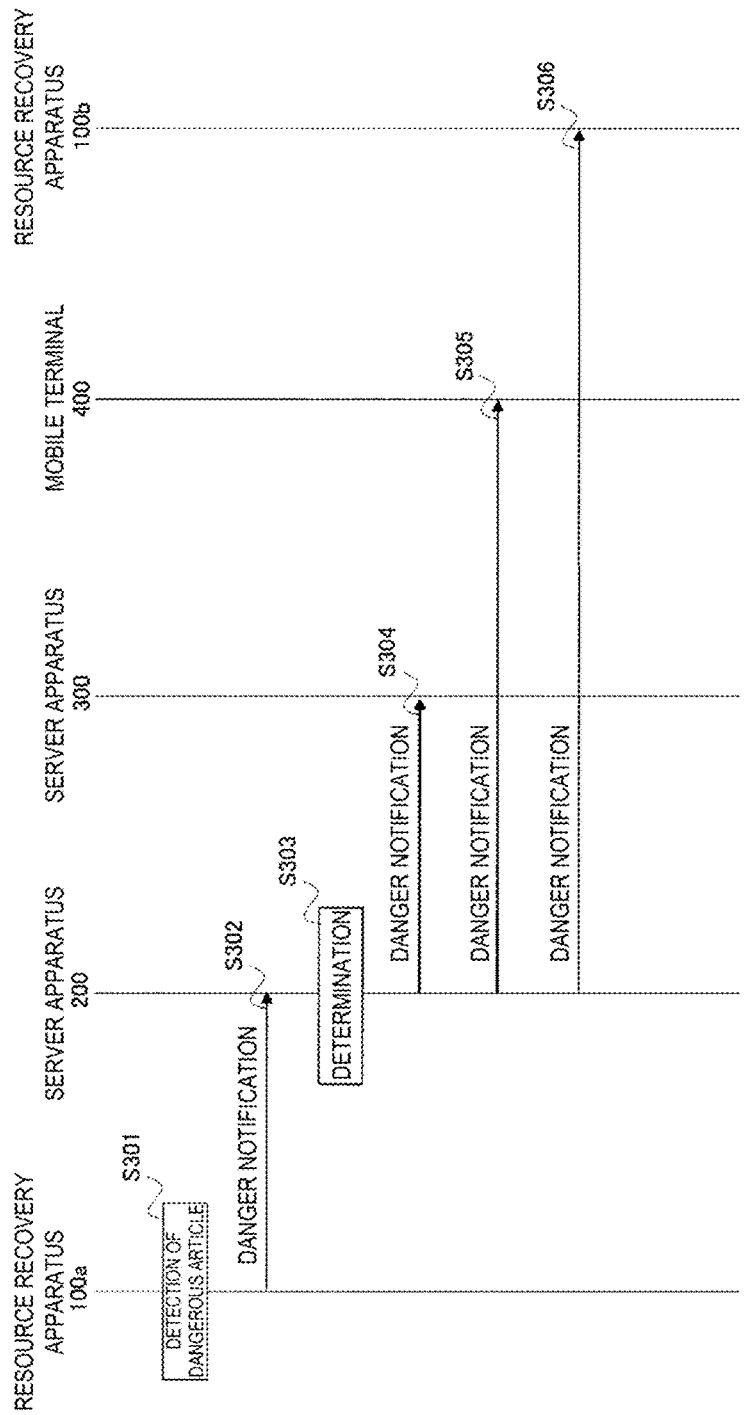

RECOVERY APPARATUS AND CONTROL METHOD OF RESOURCE RECOVERY APPARATUS

RELATED APPLICATIONS

The present application is a continuation based on PCT Application No. PCT/JP2021/020904, filed on Jun. 1, 2021, which claims the benefit of Japanese Patent Application No. 2020-098893 filed on Jun. 5, 2020, and Japanese Patent Application No. 2020-112194 filed on Jun. 29, 2020. The content of which is incorporated by reference herein in their entirety.

TECHNICAL FIELD

The present invention relates to a resource collection apparatus and a control method of the resource collection apparatus.

BACKGROUND OF INVENTION

A known technique for managing an article such as a commercial product uses an electronic tag attached to the article.

Patent Document 1 describes, in a resource collection apparatus (so-called, a garbage bin) that collects wastes which is an article discarded by a user, a method of detecting an electronic tag attached to the article and making data stored in the electronic tag unreadable by invalidating the detected electronic tag. According to the method described in Patent Document 1, invalidating the electronic tag attached to the waste makes it possible to protect the privacy of the user.

CITATION LIST

Patent Literature

Patent Document 1: Japanese patent application publication No. 2009-516262

SUMMARY

In a first aspect, a resource collection apparatus is an apparatus for collecting wastes to be reused as a resource. The resource collection apparatus includes an opening associated with a predetermined sorting type, an opening/closing unit configured to open and close the opening; a first detector configured to perform an operation to detect a target waste belonging to a user, and a controller configured to specify a sorting type into which the target waste is to be sorted, by using a result of the detection by the first detector. The controller switches the opening/closing unit from a closed state to an open state when the specified sorting type matches the sorting type associated with the opening.

In a second aspect, a control method is a method for controlling a resource collection apparatus for collecting wastes to be reused as a resource. The control method includes performing an operation to detect a target waste belonging to a user, specifying a sorting type into which the target waste is to be sorted, by using a result of the detection operation, and opening and closing an opening associated with a predetermined sorting type. The opening and closing includes switching from a closed state to an open state when the sorting type specified by the specifying matches a sorting type associated with the opening.

In a third aspect, a resource collection apparatus is an apparatus for collecting waste. The resource collection apparatus includes a first detector configured to perform a detection operation for the waste, and a controller configured to determine whether or not the waste is a hazardous material, based on a detection result of the first detector. The controller makes a danger notification to a notification destination outside the resource collection apparatus when the waste is determined to be a hazardous material.

In a fourth aspect, a resource collection system includes a resource collection apparatus according to the first aspect, and a server apparatus configured to communicate with the resource collection apparatus. Upon receipt of the danger notification from the resource collection apparatus, the server apparatus determines destinations of the danger notification based on a degree of danger of the hazardous material.

In a fifth aspect, a control method is a method for controlling a resource collection apparatus for collecting waste. The control method includes performing a detection operation for detecting the waste, determining whether or not the waste is a hazardous material based on a result of the detection operation, and making a danger notification to a notification destination outside the resource collection apparatus when the waste is determined to be a hazardous material.

BRIEF DESCRIPTION OF THE DRAWINGS

FIG. 13 is a diagram illustrating an operation example 2 of the resource collection apparatus according to the second embodiment.

FIG. 14 is a diagram illustrating a danger notification operation according to the second embodiment.

DESCRIPTION OF EMBODIMENTS

First Embodiment

When a large-scale event such as the Olympic Games is held, a large amount of waste (garbage) such as food containers and beverage containers is generated at a venue and in a surrounding urban area. Since an unspecified number of people gather, a problem of disposal of unsorted garbage dumped arises. When a large amount of unsorted garbage is dumped, it makes difficult to collect such garbage as a resource. Alternatively a garbage collector needs to sort them.

A first embodiment enables appropriate sorting of waste.

Embodiments will be described with reference to the drawings. In the description of the drawings, the same or similar parts are denoted by the same or similar reference signs.

Configuration of Resource Recovery System

Figure 1:
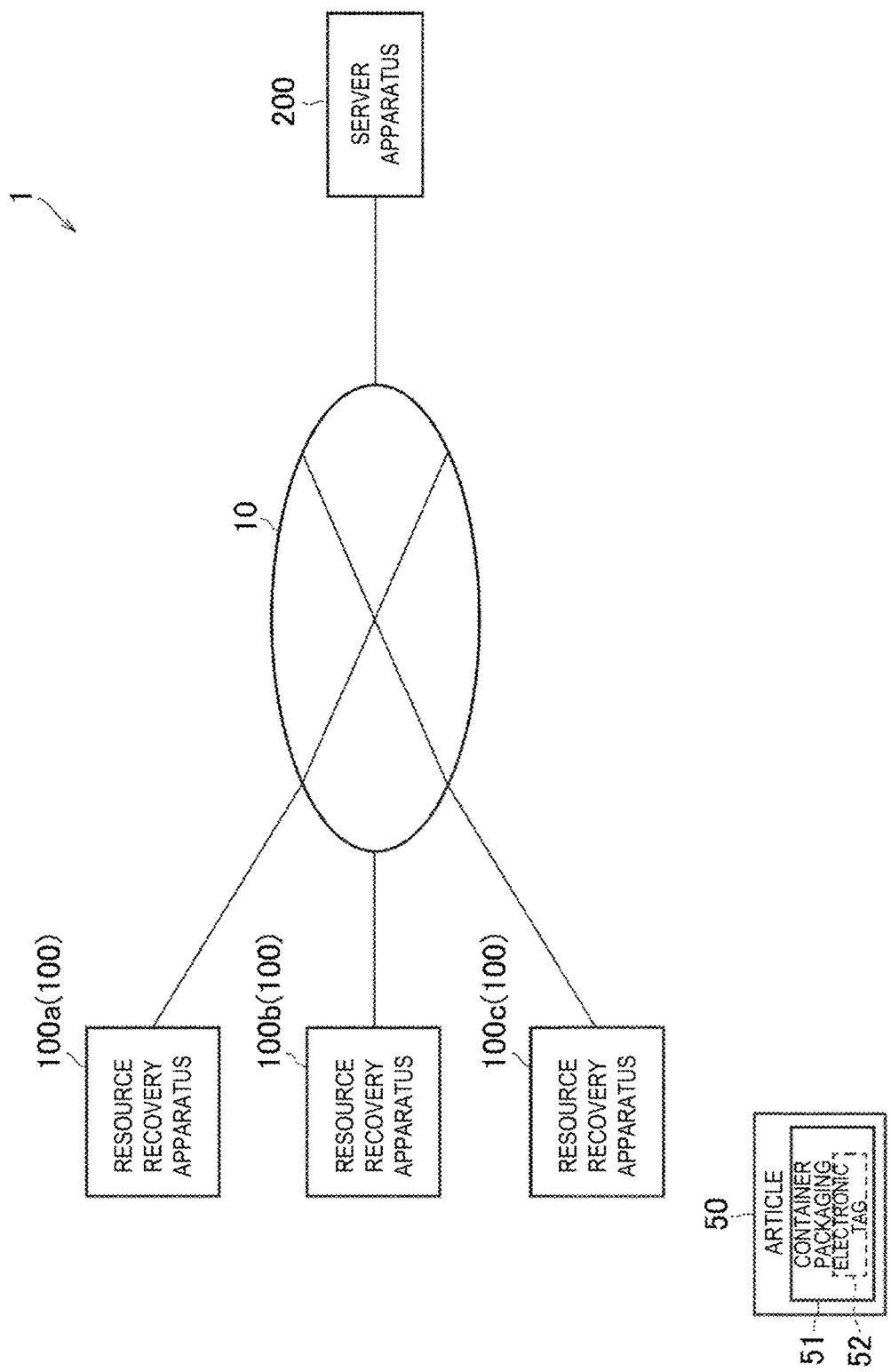
FIG. 1 is a diagram illustrating a configuration of a resource collection system according to a first embodiment.

First, a configuration example of the resource collection system according to the first embodiment will be described. The resource collection system is a system for collecting an article to be reused as a resource. Here, the article may be any article so long as it can be reused as a resource, and, for example, includes a product and/or a container packaging of the product. FIG. 1 is a diagram illustrating a configuration of a resource collection system 1 according to the first embodiment.

As illustrated in FIG. 1, the resource collection system 1 includes a plurality of resource collection apparatuses 100a, 100b, and 100c, and a server apparatus 200. The resource collection apparatuses 100a, 100b, and 100c are hereinafter simply referred to as the resource collection apparatus(es) 100 unless otherwise distinguished.

The resource collection apparatus 100 and the server apparatus 200 are connected to a network 10. The network 10 includes at least one selected from the group consisting of a Local Area Network (LAN), a Wide Area Network (WAN), and the Internet.

An article 50 may be a product, for example, a food or a drink. Hereinafter, an example in which the article 50 is a product will be described. In the first embodiment, the article 50 includes a container packaging 51 to which an electronic tag 52 is attached. The electronic tag 52 may be attached to a product body excluding the container packaging 51, or may not be attached to the container packaging 51.

At least a product identifier (product ID) identifying the article 50 is written in the electronic tag 52. The product identifier is assumed to be an individual identifier of the article 50, but the product identifier may be a product name of the article 50, or may be a set of an individual identifier and a product name. The electronic tag 52 may include information written thereon, indicating a sorting type into which the article 50 is to be sorted when disposed.

The electronic tag 52 is a passive, active, or semi-active electronic tag. In the following example, a passive electronic tag 52 is mainly used. The passive electronic tag 52 can generate electricity by receiving a radio wave and generate drive power, and thus, needs no battery.

The resource collection apparatus 100 is an apparatus for collecting waste (garbage) that is an article discarded by a user. The resource collection apparatus 100 may be a garbage bin that is temporarily placed in an event venue or a surrounding urban area. The waste is, for example, the container packaging 51 of the article 50. The resource collection apparatus 100 is a garbage bin having a communication function, and may be referred to as a smart garbage bin. The resource collection apparatus 100 may be placed indoors (for example, inside a house of a user or inside a shop), or outdoors (around a shop or on a road).

The resource collection apparatus 100 may be an apparatus attached to an existing garbage bin, or an apparatus constituting a part of a garbage bin. The type of waste to be collected (that is, a sorting type) may be determined in the resource collection apparatus 100. For example, the resource collection apparatus 100 may display information indicating the determined sorting type.

The server apparatus 200 is an apparatus managing the plurality of resource collection apparatuses 100. The server apparatus 200 communicates with the resource collection apparatuses 100 via the network 10. The server apparatus 200 may specify a utilization result of each resource collection apparatus 100, based on the information received from each resource collection apparatus 100. The utilization result refers to the extent to which the resource collection apparatus 100 is utilized, and for example, a waste amount per unit time can be used as the utilization result. The server apparatus 200 may manage a placement position of each resource collection apparatus 100. The placement position of each resource collection apparatus 100 may be registered in the server apparatus 200 in advance.

The server apparatus 200 may manage information about users who are allowed to use the resource collection apparatus 100. The information about the users includes an ID of the user and/or face data of the user. When the resource collection apparatus 100 is placed at the venue of an event, the server apparatus 200 may manage information about participants of the event as users who are allowed to use the resource collection apparatus 100. Such information may be registered in the server apparatus 200 at the time of purchasing a ticket to participate in the event.

Configuration of Resource Recovery Apparatus

Figure 2:
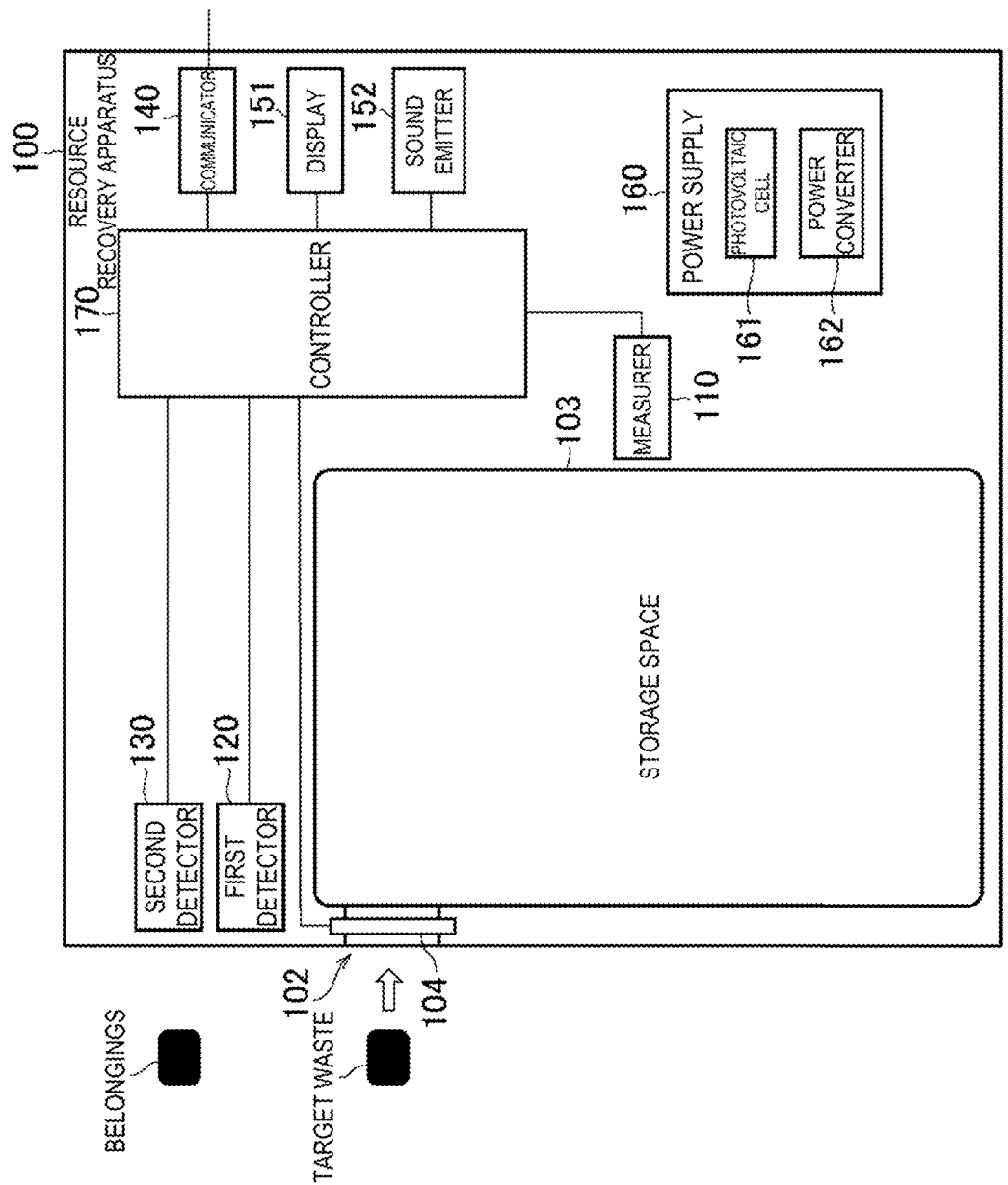
FIG. 2 is a diagram illustrating a configuration example of a resource collection apparatus according to the first embodiment.
Figure 3:
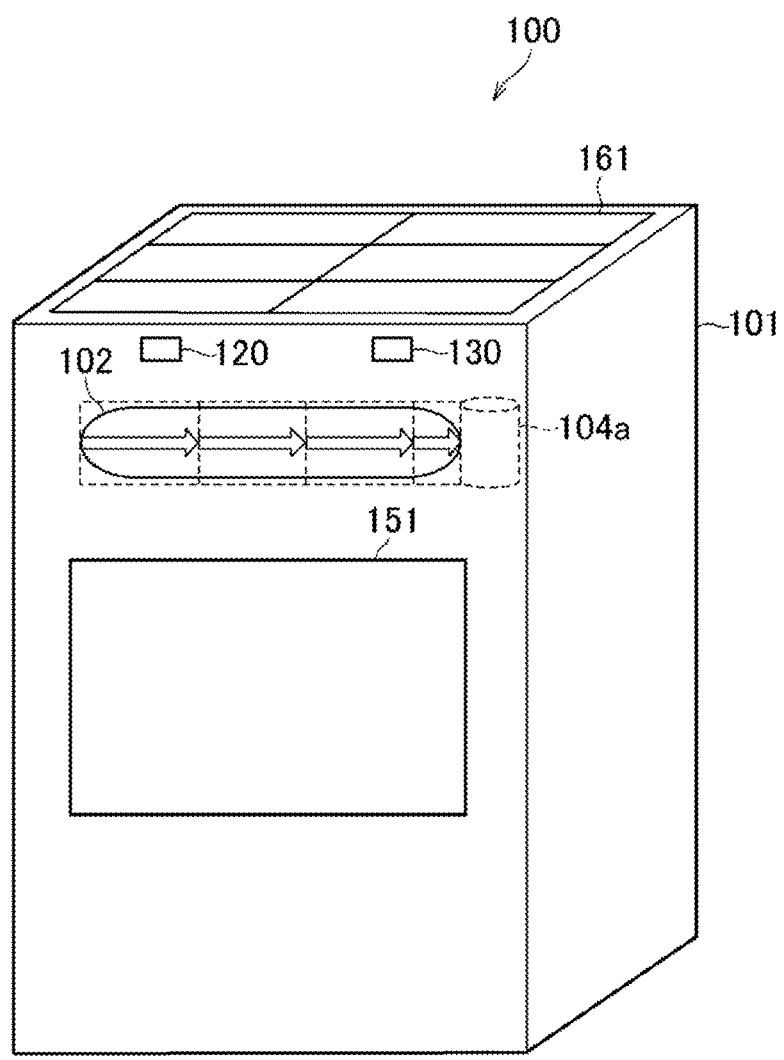
FIG. 3 is a diagram illustrating an example of an outer appearance of the resource collection apparatus according to the first embodiment.

A configuration example of the resource collection apparatus 100 will be described. FIG. 2 is a diagram illustrating a configuration example of the resource collection apparatus 100. FIG. 3 is a diagram illustrating an example of an outer appearance of the resource collection apparatus 100.

As illustrated in FIG. 2 and FIG. 3, the resource collection apparatus 100 includes a housing 101, an opening 102, a storage space 103, an opening/closing unit 104, a measurer 110, a first detector 120, a second detector 130, a communicator 140, a display 151, a sound emitter 152, a power supply 160, and a controller 170.

The opening 102 is associated with a predetermined sorting type. The opening 102 is a garbage inlet that is provided at a top surface or a side surface of the housing 101 of the resource collection apparatus 100. Waste is put into the storage space 103 through the opening 102. In the example illustrated in FIG. 3, the opening 102 is provided at a side surface of the housing 101 and has a horizontally long shape. However, the opening 102 may have a circular shape when the sorting type is for cans, bottles, and/or PET bottles.

The storage space 103 is a space to store waste. The storage space 103 may be provided with a replaceable container or a garbage bag.

The opening/closing unit 104 is provided at the opening 102 to open and close the opening 102 under control of the controller 170. The opening/closing unit 104 includes a lid (shutter), having a sheet shape, covering the opening 102 and an actuator for opening and closing the shutter. A state where the shutter of the opening/closing unit 104 is open is referred to as an open state, and a state where the shutter is closed is referred to as a closed state. The opening/closing unit 104 is basically in the closed state. As in the example illustrated in FIG. 3, a shutter 104a may be wound on one end side of the opening 102, and the opening area of the opening 102 may be adjustable by turning the wound portion with an actuator.

The measurer 110 measures a waste amount or an available space in the storage space 103 under control of the controller 170 and outputs, to the controller 170, measurement information indicating a measurement result. The measurer 110 may include at least one selected from the group consisting of a weight sensor for measuring a weight of the waste accumulated in the storage space 103, a sensor for measuring a height of the waste accumulated in the storage space 103 (for example, an ultrasonic sensor), a counter for counting the number of times waste is thrown in (the number of times of switching between the open state and the closed state of the opening/closing unit 104), and a timer for measuring a period of time during which waste is thrown in (a period of time during which the opening/closing unit 104 is kept in the open state).

The first detector 120 performs a detection operation for target waste belonging to a user and outputs a result of the detection to the controller 170. The first detector 120 performs a detection operation for specifying the target waste. The first detector 120 includes at least one selected from the group consisting of a tag reader for reading information from the electronic tag 52 attached to the target waste, a camera for capturing an image of the target waste, and a code reader for reading a barcode or a two-dimensional code attached to the target waste. In the example illustrated in FIG. 3, the first detector 120 is provided at the periphery of the opening 102, specifically, at an upper portion of a side surface of the housing 101. The first detector 120 may be provided at the top surface of the housing 101.

The second detector 130 performs a detection operation for a user or belongings of the user other than the target waste (hereinafter simply referred to as "belongings"), and outputs a result of the detection to the controller 170. The second detector 130 performs a detection operation for specifying a user. The second detector 130 includes at least one selected from the group consisting of a camera for capturing an image of a user, a code reader for reading a barcode or a two-dimensional code attached to the belongings, and a communication interface for communicating with the belongings. The above-described configuration for specifying a user enables the user to easily perform appropriate sorting.

Here, the belongings may be an IC card (non-contact type or contact type) and/or a mobile terminal (for example, a smartphone). When the resource collection apparatus 100 is placed in an area where an event is held or a surrounding area thereof, the belongings may be a ticket belonging to a participant of the event. It is assumed that a barcode or a two-dimensional code is attached to the ticket.

The second detector 130 may be configured integrally with the first detector 120. For example, each of the first detector 120 and the second detector 130 may be a camera or a code reader.

The communicator 140 is connected to the network 10 in a wired or wireless manner. The communicator 140 communicates with the server apparatus 200 via the network 10.

The display 151 displays various types of information under control of the controller 170. The display 151 includes at least one selected from the group consisting of a liquid crystal display, an organic EL display, and an electronic paper. The display 151 may display information indicating a sorting type associated with the opening 102.

The sound emitter 152 emits a sound under control of the controller 170. The sound emitter 152 includes a speaker and/or a buzzer.

The power supply 160 supplies drive power to each component in the resource collection apparatus 100. For example, the power supply 160 supplies drive power for the first detector 120, and drive power used for the opening/closing operation of the actuator of the opening/closing unit 104. The power supply 160 may include a primary battery or a secondary battery, or may include a power generation means, or may include a power conversion means for converting power from a commercial power grid.

For example, the power supply 160 includes a photovoltaic cell 161 and a power converter 162. The photovoltaic cell 161 receives light to generate direct current power and outputs the generated direct current power to the power converter 162. The power converter 162 converts the direct current power into alternating current power and outputs the alternating current power. In the example illustrated in FIG. 3, the photovoltaic cell 161 is provided on the top surface of the housing 101. When the power supply 160 includes a power generation means, battery replacement or power supply to the resource collection apparatus 100 from outside can be reduced.

The controller 170 controls each component in the resource collection apparatus 100. The controller 170 includes at least one processor and at least one memory electrically connected to the processor. The controller 170 specifies the sorting type into which the target waste is to be sorted, using the detection result of the first detector 120. The controller 170 switches the opening/closing unit 104 from the closed state to the open state when the specified sorting type matches the sorting type associated with the opening 102. On the other hand, when the specified sorting type does not match the sorting type associated with the opening 102, the controller 170 keeps the opening/closing unit 104 in the closed state. Consequently, waste that does not match the sorting type is not put into the resource collection apparatus 100 (the opening 102).

Functions of Controller

Figure 4:
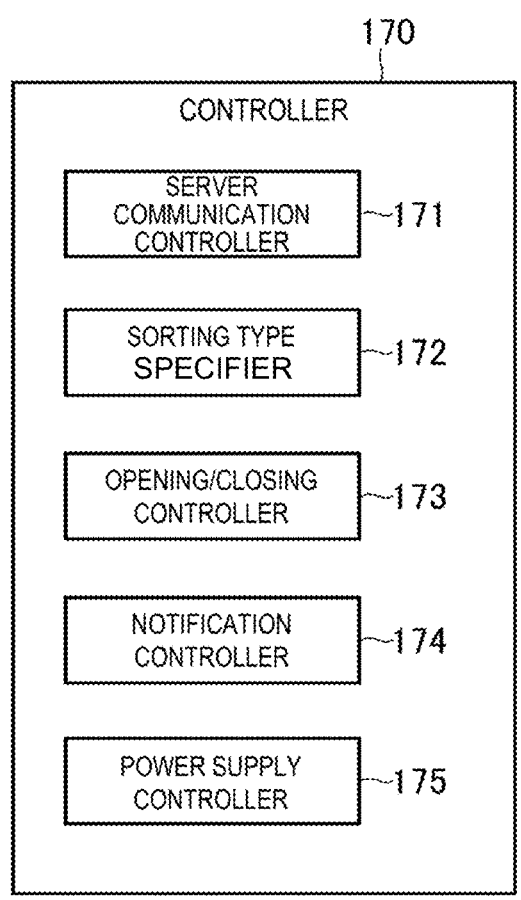
FIG. 4 is a diagram illustrating a functional block configuration of a controller according to the first embodiment.

The functions of the controller 170 according to the first embodiment will be described. FIG. 4 is a diagram illustrating a functional block configuration of the controller 170.

As illustrated in FIG. 4, the controller 170 includes a server communication controller 171, a sorting type specifier 172, an opening/closing controller 173, a notification controller 174, and a power supply controller 175.

The server communication controller 171 transmits the detection result of the second detector 130 detecting a user or his/her belongings to the server apparatus 200 via the communicator 140. The detection result of the second detector 130 includes data for specifying a user.

For example, the server communication controller 171 transmits, to the server apparatus 200, at least one selected from the group consisting of read data obtained by a code reader included in the second detector 130, imaging data obtained by a camera included in the second detector 130, and received data obtained by a communication interface included in the second detector 130.

The server apparatus 200 authenticates a user based on the detection result of the second detector 130 and information registered in advance, and stores information about the authenticated user. The server apparatus 200 notifies the resource collection apparatus 100 of information indicating success or failure of the user authentication.

The server communication controller 171 receives the information indicating success or failure of the user authentication via the communicator 140, and notifies the opening/closing controller 173 of the received information. Upon receipt of a notification about the success of the user authentication, the opening/closing controller 173 determines that the opening/closing unit 104 can be switched from the closed state to the open state. On the other hand, upon receipt of a notification about the failure of the user authentication, the opening/closing controller 173 determines that the opening/closing unit 104 cannot be switched from the closed state to the open state.

The sorting type specifier 172 specifies the sorting type into which the target waste is to be sorted, by using the detection result of the first detector 120 detecting the target waste.

For example, the sorting type specifier 172 specifies the sorting type based on read data obtained by a tag reader or a code reader included in the first detector 120. When the read data includes information indicating the sorting type, the sorting type specifier 172 specifies the sorting type based on the information indicating the sorting type.

When the read data does not include the information indicating the sorting type and the read data includes a product identifier, the sorting type specifier 172 transmits the product identifier to the server apparatus 200 via the communicator 140. The server apparatus 200 specifies the sorting type based on the product identifier, and transmits information indicating the specified sorting type to the resource collection apparatus 100. The sorting type specifier 172 specifies the sorting type based on the information from the server apparatus 200.

The sorting type specifier 172 may specify the sorting type based on imaging data obtained by a camera included in the first detector 120. The sorting type specifier 172 transmits the imaging data to the server apparatus 200 via the communicator 140. The server apparatus 200 specifies the sorting type based on the imaging data, and transmits information indicating the specified sorting type to the resource collection apparatus 100. The sorting type specifier 172 specifies the sorting type based on the information from the server apparatus 200.

The opening/closing controller 173 switches the opening/closing unit 104 from the closed state to the open state when the sorting type specified by the sorting type specifier 172 matches the sorting type associated with the opening 102. Consequently, a user can throw in the waste through the opening 102.

The opening/closing controller 173 may adjust the opening area of the opening 102 in the open state based on the size of the target waste specified or estimated using the detection result of the first detector 120. The specification or estimation of the size of the target waste may be performed by the opening/closing controller 173 or may be performed by the server apparatus 200. For example, the size of the target waste may be specified or estimated based on the sorting type specified by the sorting type specifier 172 or the product identifier. The opening area of the opening 102 in the open state is adjusted to reliably prevent waste that does not match the sorting type from being put through the opening 102.

The opening/closing controller 173 switches the opening/closing unit 104 from the open state to the closed state when a closing condition is satisfied after switching the opening/closing unit 104 from the closed state to the open state. The closing condition includes a condition that waste has been put through the opening 102 and/or a condition that a certain period of time has elapsed after the opening/closing unit 104 is switched from the closed state to the open state. Here, the opening/closing controller 173 can detect that the waste has been put through the opening 102 based on a measurement result of the measurer 110. The closing condition may include a condition that the first detector 120 has detected new waste.

When the user authentication fails, the notification controller 174 controls the display 151 and/or the sound emitter 152 to notify the user of information indicating an authentication error. When the sorting type specified by the sorting type specifier 172 does not match the sorting type associated with the opening 102, the notification controller 174 controls the display 151 and/or the sound emitter 152 to notify the user of information indicating a sorting error.

The power supply controller 175 controls the power supply 160 such that power output by the photovoltaic cell 161 included in the power supply 160 is used as the drive power described above. For example, the controller 170 controls the photovoltaic cell 161 such that power generated by the photovoltaic cell 161 is used as the drive power when it is sunny. The controller 170 may charge the secondary battery or the like with the generated power when drive power is not needed.

The power supply controller 175 may use the power from a power grid for charging the secondary battery or as the drive power when it is rainy, cloudy, or shady (when the photovoltaic cell 161 does not generate power). Here, the controller 170 may determine the weather based on the output power from the photovoltaic cell 161, or may determine the weather based on weather information acquired from an external server via the communicator 140. The weather information is information indicating current weather and/or future weather of a region including the placement position of the resource collection apparatus 100.

Operations of Resource Recovery Apparatus

Figure 5:
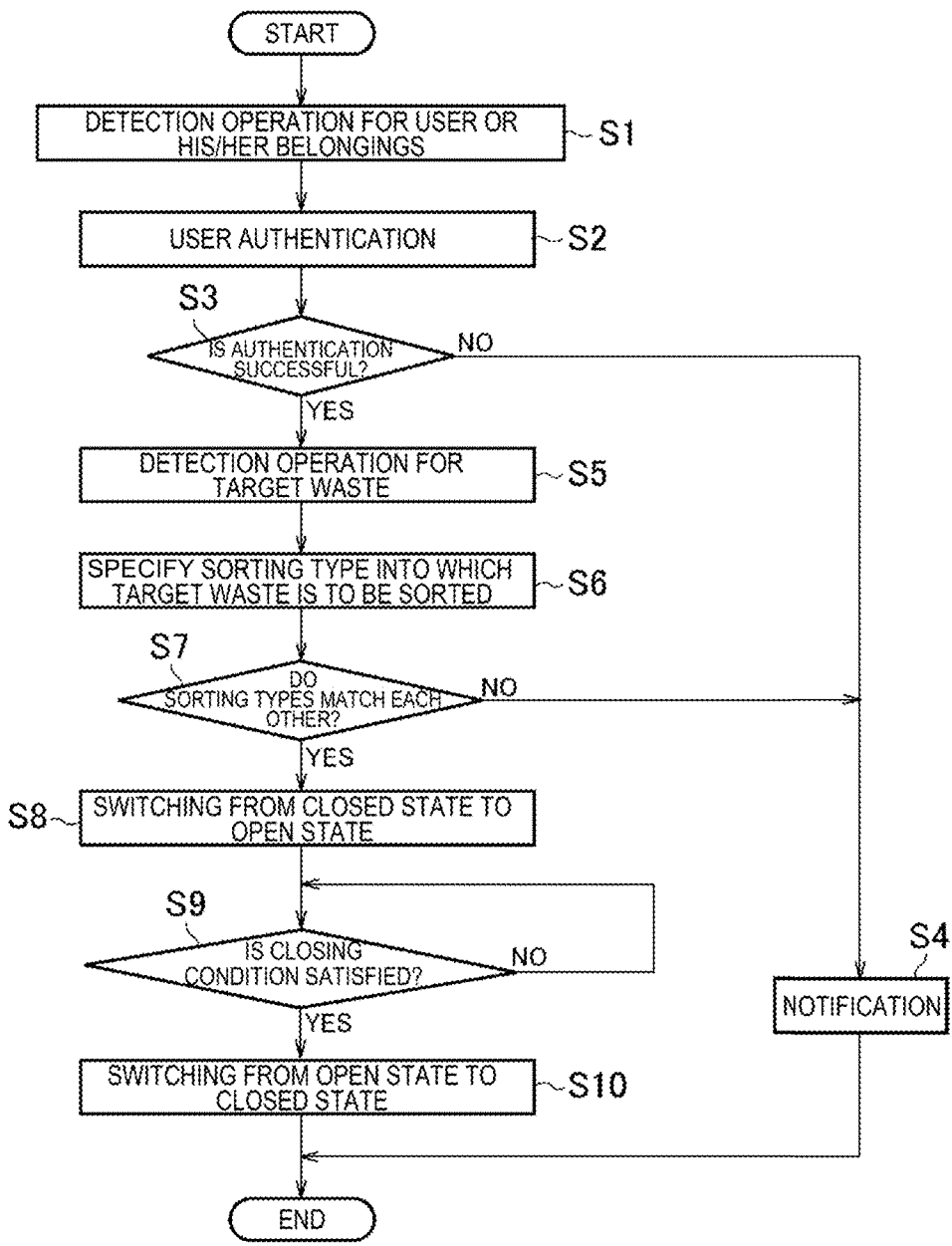
FIG. 5 is a diagram illustrating operations of the resource collection apparatus according to the first embodiment.

Operations of the resource collection apparatus 100 according to the first embodiment will be described. FIG. 5 is a diagram illustrating the operations of the resource collection apparatus 100 according to the first embodiment.

As illustrated in FIG. 5, the second detector 130 performs a detection operation for a user or his/her belongings in step S1.

In step S2, the server communication controller 171 performs authentication of a user in cooperation with the server apparatus 200 based on the detection result of the second detector 130. When the user authentication fails (step S3: NO), in step S4, the notification controller 174 controls the display 151 and/or the sound emitter 152 to notify the user of information indicating an authentication error.

On the other hand, when the user authentication is successful (step S3: YES), the first detector 120 performs a detection operation for the target waste in step S5.

In step S6, the sorting type specifier 172 specifies the sorting type into which the target waste is to be sorted, by using the detection result of the first detector 120. When the sorting type specified by the sorting type specifier 172 does not match the sorting type associated with the opening 102 (step S7: NO), in step S4, the notification controller 174 controls the display 151 and/or the sound emitter 152 to notify the user of information indicating a sorting error.

On the other hand, when the sorting type specified by the sorting type specifier 172 matches the sorting type associated with the opening 102 (step S7: YES), the opening/closing controller 173 switches the opening/closing unit 104 from the closed state to the open state in step S8. The opening/closing controller 173 may adjust the opening area of the opening 102 in the open state based on the size of the target waste specified or estimated using the detection result of the first detector 120.

In step S9, the opening/closing controller 173 determines whether or not a predetermined closing condition is satisfied. When the closing condition is not satisfied (step S9: NO), the opening/closing controller 173 maintains the open state.

On the other hand, when the closing condition is satisfied (step S9: YES), the opening/closing controller 173 switches the opening/closing unit 104 from the open state to the closed state in step S10.

Gist of First Embodiment

The resource collection apparatus 100 that collects waste to be reused as a resource includes the opening 102 associated with a predetermined sorting type, the opening/closing unit 104 configured to open and close the opening 102, the first detector 120 configured to perform a detection operation for target waste belonging to a user, and the controller 170 configured to specify a sorting type into which the target waste is to be sorted, by using the detection result of the first detector 120. The controller 170 switches the opening/closing unit 104 from the closed state to the open state when the specified sorting type matches the sorting type associated with the opening 102. Consequently, waste that does not match the sorting type can be prevented from being put into the resource collection apparatus 100 (the opening 102), so that the waste can be appropriately sorted.

Variation 1 According to First Embodiment

Figure 6:
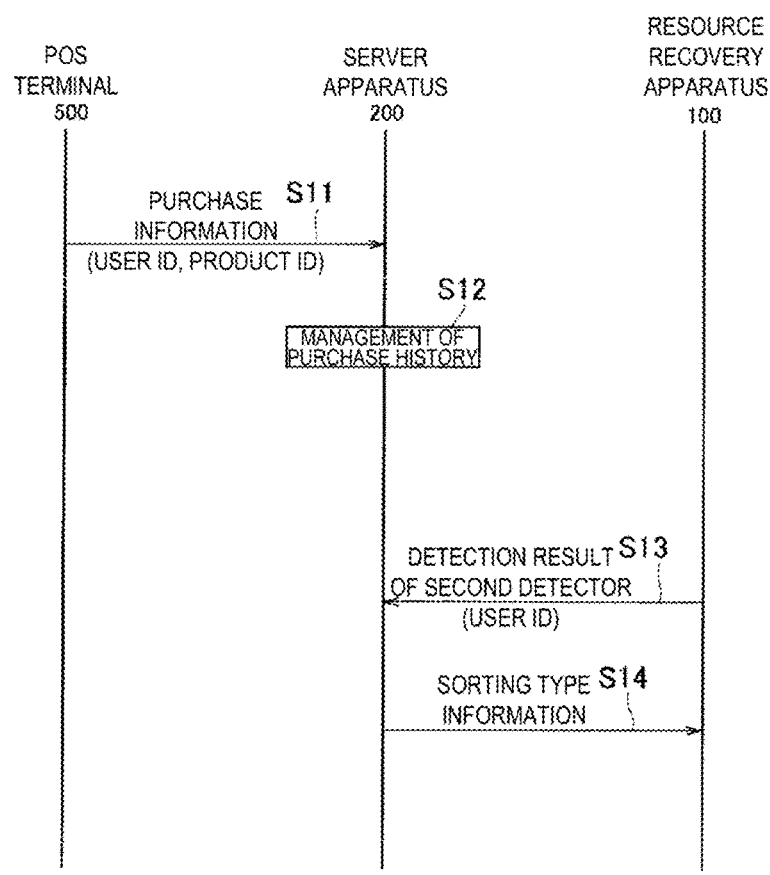
FIG. 6 is a diagram illustrating operations in a variation 1 according to the first embodiment.

In the first embodiment described above, an example has been described in which the sorting type into which a target waste is to be sorted is specified by using the detection result of the first detector 120 performing a detection operation for specifying the target waste. In addition to such a method of specifying the sorting type, the sorting type into which the target waste is to be sorted may be specified based on the purchase history of a user. FIG. 6 is a diagram illustrating operations in a variation 1 according to the first embodiment.

As illustrated in FIG. 6, in step S11, a POS terminal 500 placed at a shop transmits, to the server apparatus 200, purchase information including an identifier of a user (user ID) who has purchased an article 50 (product) and an identifier of the article 50 (product ID).

In step S12, the server apparatus 200 manages purchase history information in which the user and the purchased article are associated with each other, based on the information received from the POS terminal 500. The server apparatus 200 associates the purchased article with the sorting type into which the purchased article is to be sorted, in the purchase history information.

Then, the user consumes the article 50 (product) and then discards as waste in the resource collection apparatus 100.

In step S13, the controller 170 of the resource collection apparatus 100 transmits, to the server apparatus 200 via the communicator 140, the detection result of the second detector 130 detecting the user or his/her belongings. The detection result of the second detector 130 includes information for specifying the user ID.

In step S14, the server apparatus 200 specifies the user ID based on the information received from the resource collection apparatus 100, specifies the sorting type into which the purchased article associated with the specified user ID is to be sorted, and transmits information indicating the specified sorting type to the resource collection apparatus 100. The controller 170 (the sorting type specifier 172) of the resource collection apparatus 100 specifies the sorting type based on the information received by the communicator 140 from the server apparatus 200.

In the resource collection apparatus 100 according to the variation 1, based on the detection result of the second detector 130, the controller 170 (the opening/closing controller 173) switches the opening/closing unit 104 from the closed state to the open state when the sorting type, which has been specified based on the purchase history information related to the product purchased by the user, matches the sorting type associated with the opening 102.

For example, the opening/closing controller 173 may switch the opening/closing unit 104 from the closed state to the open state when a first sorting type specified by using the detection result of the first detector 120 and/or a second sorting type specified by using the purchase history information matches the sorting type associated with the opening 102.

The opening/closing controller 173 may switch the opening/closing unit 104 from the closed state to the open state when both of the first sorting type and the second sorting type match the sorting type associated with the opening 102. Consequently, the accuracy of specifying the sorting type can be increased, and appropriate sorting of wastes.

When specification of the first sorting type using the detection result of the first detector 120 fails, the opening/closing controller 173 may control the opening/closing unit 104 based on the second sorting type specified by using the purchase history information. Consequently, even when the first detector 120 fails in the detection operation or no sorting type is specified based on the detection result of the first detector 120, opening and closing of the opening/closing unit 104 can be controlled by using the sorting type specification method according to the variation 1.

Variation 2 According to First Embodiment

In the first embodiment described above, an example has been described in which the resource collection apparatus 100 includes one opening 102. However, the resource collection apparatus 100 may include a plurality of openings 102 each of which is associated with a sorting type.

Figure 7:
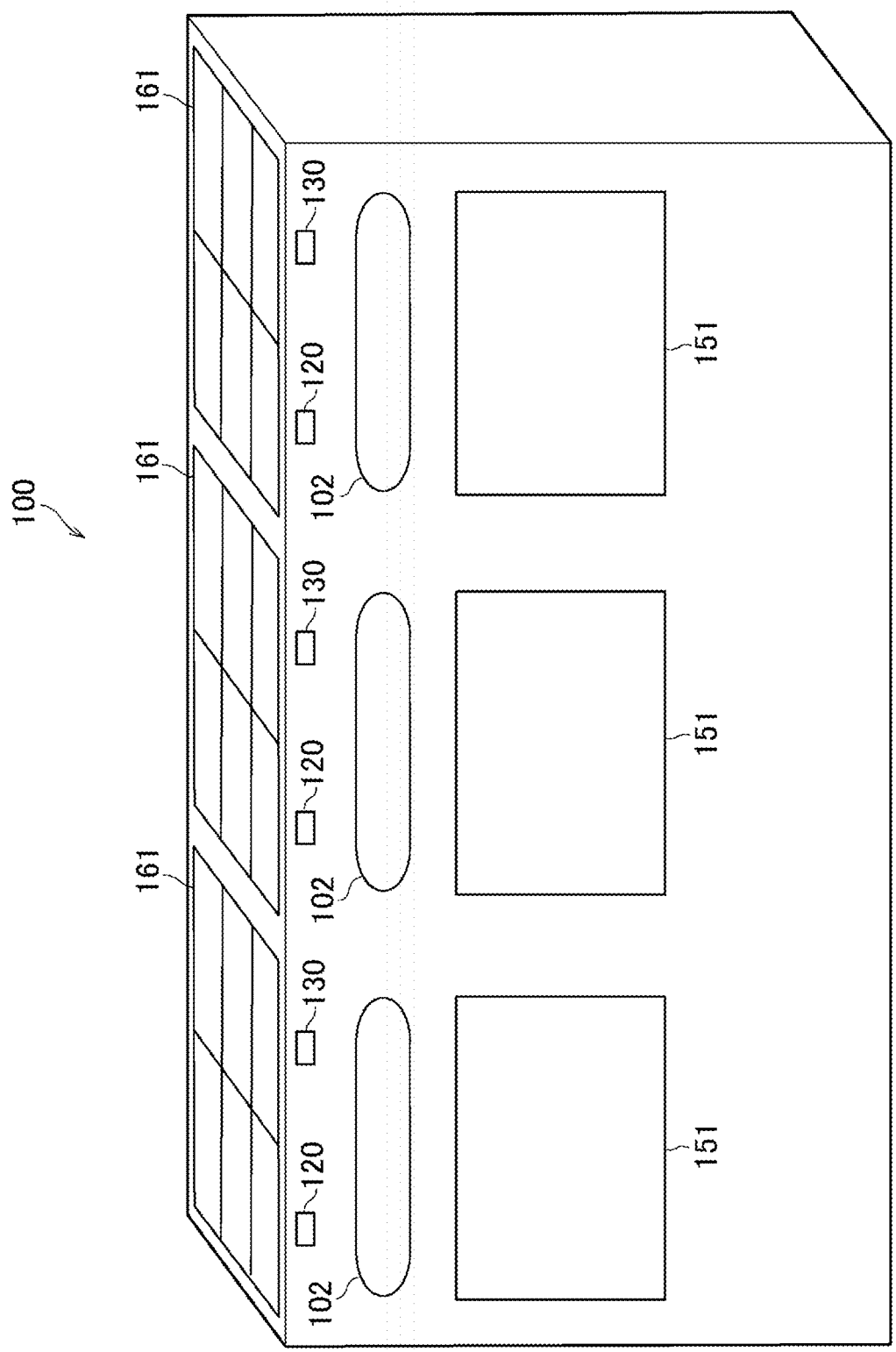
FIG. 7 is a diagram illustrating an example of an outer appearance of a resource collection apparatus in a variation 2 according to the first embodiment.

FIG. 7 is a diagram illustrating an example of the outer appearance of the resource collection apparatus 100 in a variation 2 according to the first embodiment. As illustrated in FIG. 7, the resource collection apparatus 100 includes a plurality of openings 102 each of which is associated with a sorting type, and a plurality of opening/closing units 104 including the opening/closing unit 104 individually provided at each of the plurality of openings 102.

In the configuration example illustrated in FIG. 7, the first detector 120, the second detector 130, and the display 151 are individually provided at each of the openings 102. Specifically, three first detectors 120, three second detectors 130, and three displays 151 are provided for the three openings 102.

Figure 8:
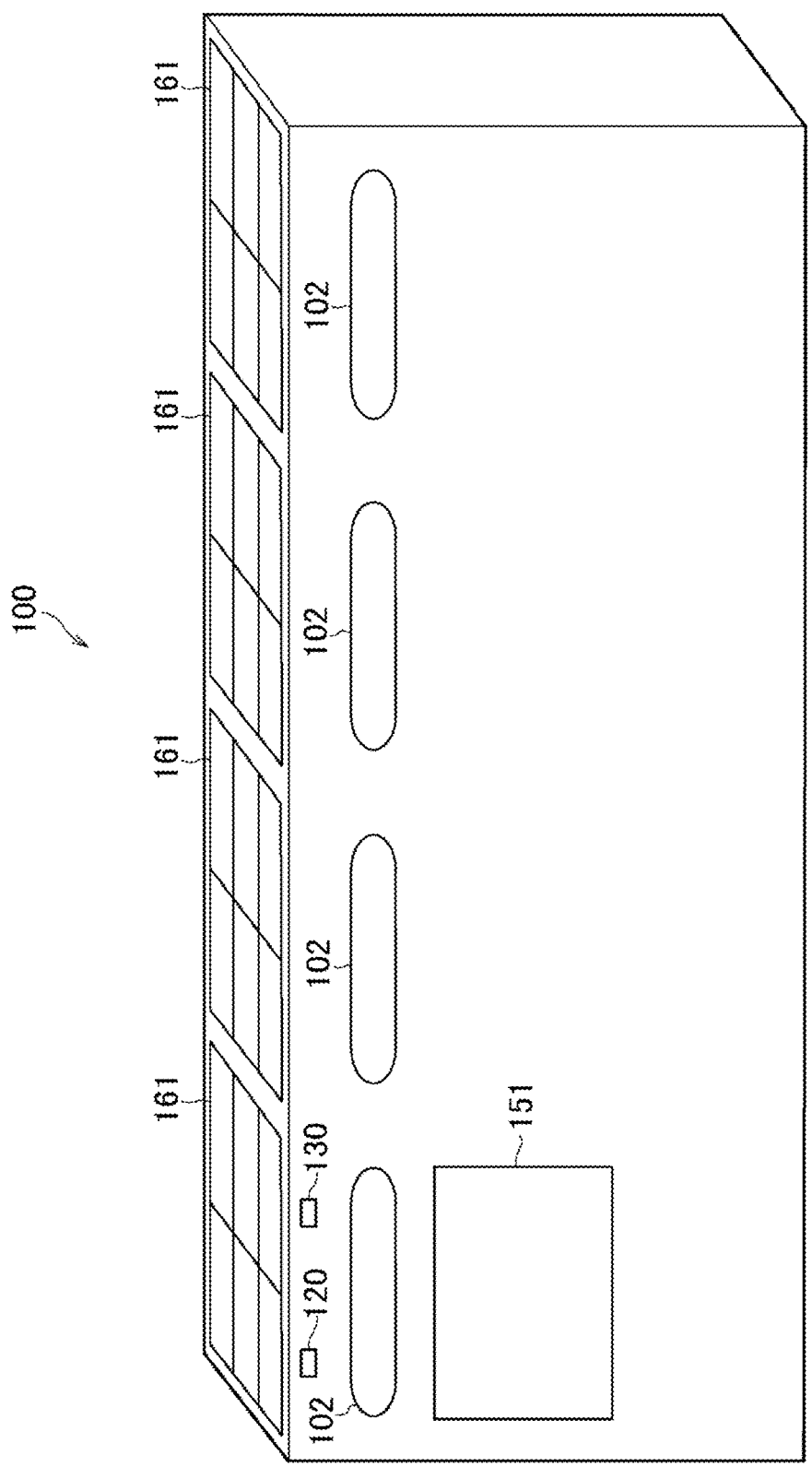
FIG. 8 is a diagram illustrating another example of an outer appearance of the resource collection apparatus in the variation 2 according to the first embodiment.

However, at least one selected from the group consisting of the first detector 120, the second detector 130, and the display 151 may be shared by the plurality of openings 102. FIG. 8 is a diagram illustrating another example of the outer appearance of the resource collection apparatus 100 in the variation 2 according to the first embodiment. As illustrated in FIG. 8, one first detector 120, one second detector 130, and one display 151 are provided for the three openings 102.

In the variation 2, when the sorting type specified using the detection result of the first detector 120 matches the sorting type of one opening 102 among the plurality of openings 102, the controller 170 switches the opening/closing unit 104 provided at the one opening 102 from the closed state to the open state. As a sorting type specification method, the specification method of the variation 1 described above may be used.

Consequently, in the resource collection apparatus 100 capable of dealing with a plurality of sorting types, only the opening 102 whose sorting type matches the sorting type of waste can be made available to a user, which enables appropriate sorting of waste.

Here, the first detector 120 may detect a plurality of kinds of waste belonging to a user. The plurality of kinds of waste may be sorted into different sorting types from each other. When the first detector 120 detects the plurality of kinds of waste to be sorted into different sorting types, the controller 170 (opening/closing controller 173) of the resource collection apparatus 100 may determine the order of switching the plurality of opening/closing units 104 from the closed state to the open state based on the sorting type of each of the plurality of kinds of waste. The opening/closing controller 173 sequentially switches the opening/closing units 104 to the open state in accordance with the determined order.

Such a priority order may be determined in advance for each sorting type. For example, the priority order of an empty PET bottle container is lower than the priority order of raw garbage. When a user has two kinds of waste of an empty PET bottle container and raw garbage, the opening/closing unit 104 of the opening 102 associated with raw garbage is switched to the open state prior to the opening/closing unit 104 of the opening 102 associated with PET bottles. If raw garbage is mixed in the storage space 103 for PET bottles, it causes a trouble in a post process. Therefore, a low priority order may be set for garbage of a sorting type that is not desired to be mixed with garbage of other sorting types.

Second Embodiment

When a large-scale event such as the Olympic Games is held, a large number of unspecified people gather and a large amount of waste (garbage) such as food containers and beverage containers is generated at a venue and in a surrounding urban area. While garbage bins are desirably placed so as to collect waste, there is a problem in that the installation of garbage bins is avoided, for example, from the viewpoint of the risk of terroristic acts, such as disposal of a hazardous material in a garbage bin.

The second embodiment enables reduction or prevention of damages caused by disposal of hazardous materials.

The second embodiment will be described focusing on differences from the first embodiment, and the description of similar or same configuration is omitted.

Configuration of Resource Recovery System

The configuration example of the resource collection system according to the second embodiment is same as and/or similar to the configuration example of the resource collection system according to the first embodiment. The second embodiment assumes that articles can be reused as resources, but may cover articles that are not necessarily reused as resources.

When a large-scale event such as the Olympic Games is held, a large number of unspecified people gather and a large amount of waste such as food containers and beverage containers is generated at a venue and in a surrounding urban area. In the second embodiment, although the resource collection apparatus 100 is placed to collect waste, a case is also assumed in which hazardous materials are discarded in the resource collection apparatus 100. The hazardous materials mainly refer to explosives, but also include toxic gases, and unextinguished cigarette butts.

Configuration of Resource Recovery Apparatus

Figure 9:
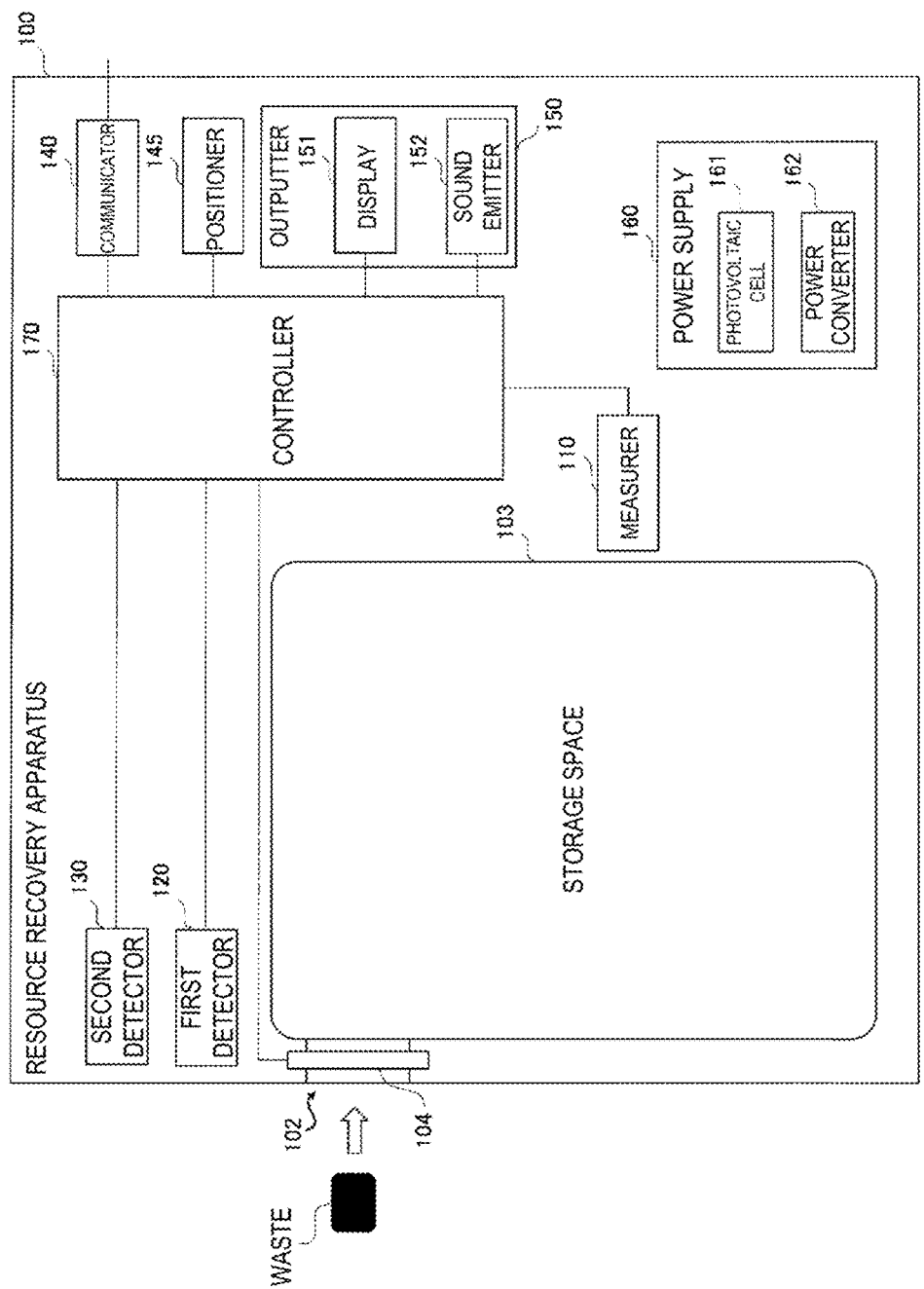
FIG. 9 is a diagram illustrating a configuration example of a resource collection apparatus according to a second embodiment.

A configuration example of the resource collection apparatus 100 will be described. FIG. 9 is a diagram illustrating a configuration example of the resource collection apparatus 100. The drawing illustrating an example of the outer appearance of the resource collection apparatus 100 is same as and/or similar to the drawing (FIG. 3) illustrating an example of the outer appearance of the resource collection apparatus 100 according to the first embodiment.

As illustrated in FIG. 9 and FIG. 3, the resource collection apparatus 100 includes a housing 101, an opening 102, a storage space 103, an opening/closing unit 104, a measurer 110, a first detector 120, a second detector 130, a communicator 140, a positioner 145, an outputter 150, a sound emitter 152, a power supply 160, and a controller 170.

The housing 101 is a container having a box shape and housing each component in the resource collection apparatus 100. The housing 101 may be configured as a pressure-resistant explosion-proof container. Although FIG. 3 illustrates an example in which the housing 101 has a rectangular parallelepiped shape, the housing 101 does not necessarily have a rectangular parallelepiped shape and may have another shape such as a cylindrical shape.

The opening 102 is a garbage inlet that is provided at a top surface or a side surface of the housing 101 of the resource collection apparatus 100. Waste is put into the storage space 103 through the opening 102. The opening 102 may be associated with a predetermined sorting type. In the example illustrated in FIG. 3, the opening 102 is provided at a side surface of the housing 101 and has a horizontally long shape. However, the opening 102 may have a circular shape when the sorting type is for cans, bottles, and/or PET bottles.

The storage space 103 is a space to store waste. The storage space 103 may be provided with a replaceable container or a garbage bag.

The opening/closing unit 104 is provided at the opening 102 to open and close the opening 102 under control of the controller 170. The opening/closing unit 104 includes a lid (shutter), having a sheet shape, covering the opening 102 and an actuator opening and closing the shutter. A state where the shutter of the opening/closing unit 104 is open is referred to as an open state, and a state where the shutter is closed is referred to as a closed state. The opening/closing unit 104 is basically in the closed state. As in the example illustrated in FIG. 3, a shutter 104a may be wound on one end side of the opening 102, and the opening area of the opening 102 may be adjustable by turning the wound portion with an actuator.

The measurer 110 measures a waste amount or an available space in the storage space 103 under control of the controller 170 and outputs, to the controller 170, measurement information indicating a result of the measurement. The measurer 110 may include at least one selected from the group consisting of a weight sensor for measuring a weight of the waste accumulated in the storage space 103, a sensor for measuring a height of the waste accumulated in the storage space 103 (for example, an ultrasonic sensor), a counter for counting the number of times waste is thrown in (the number of times of switching between the open state and the closed state of the opening/closing unit 104), and a timer for measuring a period of time during which waste is thrown in (a period of time during which the opening/closing unit 104 is kept in the open state).

The first detector 120 performs a detection operation for waste and outputs a result of the detection to the controller

170. The first detector 120 is used to determine whether or not the waste is a hazardous material. A specific example of the first detector 120 will be described later. In the example illustrated in FIG. 3, the first detector 120 is provided at the periphery of the opening 102, specifically, at an upper portion of a side surface of the housing 101. The first detector 120 may be provided at the top surface of the housing 101. The first detector 120 may be housed in the housing 101.

The second detector 130 performs a detection operation for a user disposing of the waste or a detection operation for belongings of the user other than the waste, and outputs a result of the detection to the controller 170. The second detector 130 is used to specify a user, and a specific example of the second detector 130 will be described later. Here, the belongings may be an IC card (non-contact type or contact type) and/or a mobile terminal (for example, a smartphone). When the resource collection apparatus 100 is placed in an area where an event is held or a surrounding area thereof, the belongings may be a ticket belonging to a participant of the event. It is assumed that a barcode or a two-dimensional code is attached to the ticket.

The communicator 140 is connected to the network 10 in a wired or wireless manner. The communicator 140 communicates with the server apparatus 200 via the network 10.

The positioner 145 generates positional information indicating a placement position of the resource collection apparatus 100, for example, through positioning by use of positioning satellites, and outputs the generated positional information to the controller 170. The positioner 145 includes a Global Navigation Satellite System (GNSS) receiver. The positioner 145 may perform, in addition to or instead of the satellite positioning, base station positioning using a radio signal received from a cellular base station or a wireless LAN access point. The positioner 145 may be at least partially integrated with the communicator 140.

The outputter 150 outputs a sound and/or an image. The outputter 150 includes a display 151 and/or the sound emitter 152.

The display 151 displays various types of information under control of the controller 170. The display 151 includes at least one selected from the group consisting of a liquid crystal display, an organic EL display, and an electronic paper. The display 151 may display information indicating a sorting type associated with the opening 102.

The sound emitter 152 emits a sound under control of the controller 170. The sound emitter 152 includes a speaker and/or a buzzer.

The power supply 160 supplies drive power to each component in the resource collection apparatus 100. For example, the power supply 160 supplies drive power for the first detector 120, and drive power used for the opening/closing operation of the actuator of the opening/closing unit 104. The power supply 160 may include a primary battery or a secondary battery, or may include a power generation means, or may include a power conversion means for converting power from a commercial power grid.

For example, the power supply 160 includes a photovoltaic cell 161 and a power converter 162. The photovoltaic cell 161 receives light to generate direct current power and outputs the generated direct current power to the power converter 162. The power converter 162 converts the direct current power into alternating current power and outputs the alternating current power. In the example illustrated in FIG. 3, the photovoltaic cell 161 is provided on the top surface of the housing 101. When the power supply 160 includes a power generation means, battery replacement or power supply to the resource collection apparatus 100 from outside can be reduced.

The controller 170 controls each component in the resource collection apparatus 100. The controller 170 includes at least one processor and at least one memory electrically connected to the processor. The controller 170 determines whether or not waste is a hazardous material, based on the detection result of the first detector 120. The controller 170 may determine whether or not waste is a hazardous material, after the waste is discarded, that is, after the waste is stored in the storage space 103. The controller 170 may determine whether or not waste is a hazardous material before the waste is discarded, that is, before the waste is put through the opening 102.

The controller 170 makes a danger notification to a notification destination outside the resource collection apparatus 100 when waste is determined to be a hazardous material. For example, the controller 170 makes a danger notification to the server apparatus 200 as a notification destination by using the communicator 140. In such a danger notification, the controller 170 may notify the server apparatus 200 of the positional information output by the positioner 145. Consequently, even when the placement position of the resource collection apparatus 100 is appropriately changed as necessary, the server apparatus 200 can recognize the current position of the resource collection apparatus 100 that has detected a hazardous material.

The controller 170 may notify, by using the communicator 150, the danger to people around the resource collection apparatus 100 as notification destinations. For example, the controller 170 issues an audio danger warning by using the sound emitter 152. The controller 170 uses the display 151 to indicate that a hazardous material has been detected, or to display an image of an expected damage range. In other words, the controller 170 may control the sound emitter 152 to issue an audio danger warning. The controller 170 may control the display 151 to indicate that a hazardous material has been detected, or to display an image of an expected damage range.

Here, when a waste is determined to be a hazardous material, the controller 170 may determine the degree of danger of the hazardous material based on the detection result of the first detector 120, and control an output sound volume of the sound emitter 152 based on the determined degree of danger. For example, the controller 170 performs control such that the output sound volume of the sound emitter 152 is increased with the increase in the determined degree of danger.

The controller 170 controls the power supply 160 such that power output by the photovoltaic cell 161 included in the power supply 160 is used as the drive power described above. For example, the controller 170 controls the photovoltaic cell 161 such that power generated by the photovoltaic cell 161 is used as the drive power when it is sunny. The controller 170 may charge the secondary battery or the like with the generated power when drive power is not needed.

The controller 170 may use the power from a power grid for charging the secondary battery or as the drive power when it is rainy, cloudy, or shady (when the photovoltaic cell 161 does not generate power). Here, the controller 170 may determine the weather based on the output power from the photovoltaic cell 161, or may determine the weather based on weather information acquired from an external server via the communicator 140. The weather information is information indicating current weather and/or future weather of a region including the placement position of the resource collection apparatus 100.

Configuration of First Detector

Figure 10:
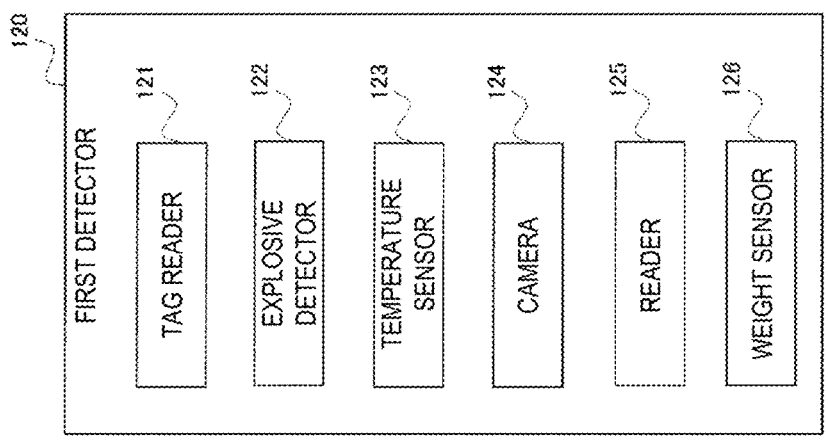
FIG. 10 is a diagram illustrating a configuration example of a first detector according to the second embodiment.

The configuration of the first detector 120 according to the second embodiment will be described. FIG. 10 is a diagram illustrating a configuration example of the first detector 120 according to the second embodiment.

As illustrated in FIG. 10, the first detector 120 includes at least one selected from the group consisting of a tag reader 121, an explosive detector 122, a temperature sensor 123, a camera 124, a reader 125, and a weight sensor 126.

The tag reader 121 reads information from an electronic tag 52 attached to a waste and outputs the read information to the controller 170. The tag reader 121 may perform a read operation for the waste stored in the storage space 103 or may perform a read operation for the waste approaching the opening 102. The controller 170 determines whether or not the electronic tag 52 is attached to the waste, based on the detection result of the tag reader 121. When it is determined that no electronic tag 52 is attached to the waste, the controller 170 determines (assumes) that the waste is a hazardous material.

For example, under the premise that the electronic tag 52 is attached to only products inside an event venue, the controller 170 discriminates between a product sold inside the event venue and a product brought from outside and determines (presumes) that the product brought from outside is a hazardous material, based on the detection result of the tag reader 121. When the second detector 130 recognizes a user who intends to discard waste and the tag reader 121 detects no electronic tag 52, the controller 170 may determine that the waste is a hazardous material. When the camera 124 recognizes waste and the tag reader 121 detects no electronic tag 52, the controller 170 may determine that the waste is a hazardous material.

The explosive detector 122 detects the presence of an explosive and outputs the detection result to the controller 170. The explosive detector 122 may perform a detection operation for the waste stored in the storage space 103, or may perform a detection operation for the waste approaching the opening 102. The explosive detector 122 analyzes physical properties of waste by, for example, volatile gas sampling method, electromagnetic induction method, or Raman spectrometric method, to detect the presence of an explosive. When the explosive detector 122 detects the presence of the explosive, the controller 170 determines that the waste is a hazardous material.

The temperature sensor 123 measures a temperature associated to the waste and outputs the measurement result to the controller 170. The temperature sensor 123 may include a thermistor or may include an infrared temperature sensor. The temperature sensor 123 may perform a measurement operation for the waste stored in the storage space 103 or may perform a measurement operation for the waste approaching the opening 102. When the temperature measured by the temperature sensor 123 is higher than a predetermined temperature, the controller 170 determines that the waste is a hazardous material. For example, when a fire occurs in the storage space 103 due to, for example, an improperly extinguished cigarette as a hazardous material, the temperature sensor 123 can detect a temperature rise caused by the fire.

The camera 124 captures an image of the waste and outputs image data to the controller 170. The camera 124 may capture an image of the waste stored in the storage space 103 or may capture an image of the waste approaching the opening 102. The controller 170 performs image recognition on the image data. When the result of the image recognition indicates a hazardous material, the controller 170 determines that the waste is a hazardous material. For example, the controller 170 compares the image or the feature amount of a hazardous material determined in advance with the image data output by the camera 124, and determines the waste is a hazardous material when the degree of coincidence is high. The controller 170 may perform hazardous material determination using the camera 124 only for waste whose tag information cannot be recognized by the tag reader 121.

The reader 125 reads information for specifying waste from the electronic tag 52 or a code (barcode or two-dimensional code) attached to the waste, and outputs the read result to the controller 170. The reader 125 includes a tag reader and/or a code reader. The tag reader may be integrated with the tag reader 121 described above.

The controller 170 may control image recognition based on the information read by the reader 125. For example, the controller 170 specifies the product type of waste based on the information read by the reader 125, and acquires an image corresponding to the specified product type or the feature amount thereof. Here, the controller 170 may acquire the image corresponding to the specified product type or the feature amount thereof from the server apparatus 200 via the communicator 140. The controller 170 compares the image corresponding to the specified product type or the feature amount thereof with the image data output by the camera 124, and determines that the waste is a hazardous material when the degree of coincidence is low. That is, when a general shape corresponding to the product type and the shape of the waste are different from each other, the controller 170 may determine that the waste is a hazardous material.

The weight sensor 126 measures the weight of waste and outputs the measurement result to the controller 170. The weight sensor 126 may measure a difference between the weight of waste before disposal and the weight of the waste after disposal as the weight of the waste. When the weight measured by the weight sensor 126 exceeds a weight threshold value, the controller 170 determines that the waste is a hazardous material. That is, when the weight measured by the weight sensor 126 is too heavy compared to the weight of general waste, the controller 170 may determine that the waste is a hazardous material.

The controller 170 may control a weight threshold value based on the information read by the reader 125. For example, the controller 170 specifies the product type of waste based on the information read by the reader 125, and acquires a weight threshold value corresponding to the specified product type. Here, the controller 170 may acquire and determine the weight threshold value corresponding to the specified product type from the server apparatus 200 via the communicator 140. When the weight measured by the weight sensor 126 exceeds the set weight threshold value, the controller 170 determines that the waste is a hazardous material.

Configuration of Second Detector

Figure 11:
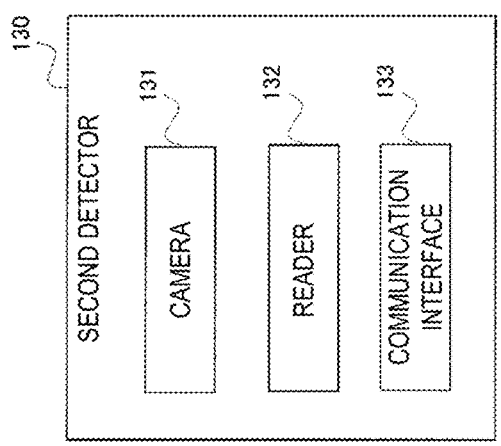
FIG. 11 is a diagram illustrating a configuration example of a second detector according to the second embodiment.

The configuration of the second detector 130 according to the second embodiment will be described. FIG. 11 is a diagram illustrating a configuration example of the second detector 130 according to the second embodiment.

As illustrated in FIG. 11, the second detector 130 includes at least one selected from the group consisting of a camera 131, a reader 132, and a communication interface 133. The second detector 130 may be integrated with the first detector 120.

The camera 131 captures an image of a user who uses the resource collection apparatus 100 and outputs image data to the controller 170. The reader 132 reads information from a barcode or a two-dimensional code attached to an event ticket belonging to a user, or reads information from an electronic ticket (barcode or two-dimensional code) displayed on a mobile terminal belonging to the user, and outputs the read result to the controller 170. The communication interface 133 receives information from an IC card belonging to a user through near field communication (NFC) and outputs the received information to the controller 170.

When a hazardous material is detected using the first detector 120, in a danger notification to the server apparatus 200, the controller 170 may notify the notification destination of the detection result of the second detector 130. On the other hand, when no hazardous material is detected using the first detector 120, the controller 170 may delete the detection result of the second detector 130. The detection result of the second detector 130 is deleted to prevent leakage of personal information of persons other than dangerous persons.

For example, the controller 170 temporarily stores the image data output by the camera 131 included in the second detector 130. When a hazardous material is detected, the controller 170 transmits, to the server apparatus 200 via the communicator 140, image data for a predetermined period of time before and after the timing when the hazardous material is detected. Consequently, the server apparatus 200 can acquire and record image data including a user who has discarded the hazardous material as a subject.

The controller 170 may constantly transmit the image data output by the camera 131 to the server apparatus 200 via the communicator 140. The server apparatus 200 may record image data for a predetermined period of time before and after the timing of receipt of a danger notification from the resource collection apparatus 100.

The controller 170 may perform user authentication by transmitting the detection result of the second detector 130 to the server apparatus 200 via the communicator 140. For example, the server apparatus 200 authenticates a user based on the detection result of the second detector 130 and information registered in advance, and notifies the resource collection apparatus 100 of information indicating success or failure of the user authentication. Upon receipt of a notification about the success of the user authentication, the controller 170 may determine that the opening/closing unit 104 can be switched from the closed state to the open state. Upon receipt of a notification about the failure of the user authentication, the controller 170 may determine that the opening/closing unit 104 cannot be switched from the closed state to the open state.

The controller 170 may determine whether or not a user is a dangerous person, based on the detection result of the second detector 130. For example, the controller 170 transmits the image data output by the camera 131 to the server apparatus 200 via the communicator 140. The server device 200 specifies a motion, a perspiration condition, or the like of a user in an image through image recognition based on the image data, determines whether or not the user is a dangerous person (for example, the user attempts to commit a terroristic act) using past case data or a learned model based on the past case data, and notifies the resource collection apparatus 100 of the determination result. When the user is determined to be a dangerous person, the controller 170 determines that the waste discarded by the user is a hazardous material.

Control of Opening and Closing of Opener

The control of opening and closing of the opening/closing unit 104 according to the second embodiment will be described.

First, a case will be described in which the controller 170 detects a hazardous material after waste is discarded. The opening/closing unit 104 for opening and closing the opening 102 into which waste is thrown is basically in a closed state. After the opening/closing unit 104 is switched from the closed state to the open state, waste is put through the opening 102. Here, it is assumed that the controller 170 has determined that the waste is a hazardous material using the first detector 120. When the waste is determined to be a hazardous material, the controller 170 switches the opening/closing unit 104 from the open state to the closed state and remains closed. Consequently, damages caused by a discarded hazardous material can be reduced.

Secondly, a case will be described in which the controller 170 detects a hazardous material before waste is discarded. It is assumed that the controller 170 has determined that the waste is a hazardous material using the first detector 120 or the second detector 130. In this case, the controller 170 remains closed without switching the opening/closing unit 104 from the closed state to the open state. Consequently, hazardous material is from being thrown.

In both cases where the controller 170 detects a hazardous material after waste is discarded and where the controller 170 detects a hazardous material before waste is discarded, the controller 170 may adjust the opening area of the opening/closing unit 104 in the open state based on the size of the waste. Here, the determination or estimation of the size of the waste may be executed by the controller 170 or may be executed by the server apparatus 200. For example, the size of the waste may be determined or estimated based on information read by the tag reader 121 or the reader 125. The opening area of the opening 102 in the open state is adjusted, so that hazardous material is not put through the opening 102.

In a case where the opening area of the opening/closing unit 104 is adjusted based on the size of waste, the controller 170 may determine that the waste can be a hazardous material when detecting that the waste is forcibly pushed through the opening 102 (for example, when detecting a constant pressure at the opening/closing unit 104).

Operation Examples of Resource Recovery Apparatus

Operation examples of the resource collection apparatus 100 according to the second embodiment will be described.

Figure 12:
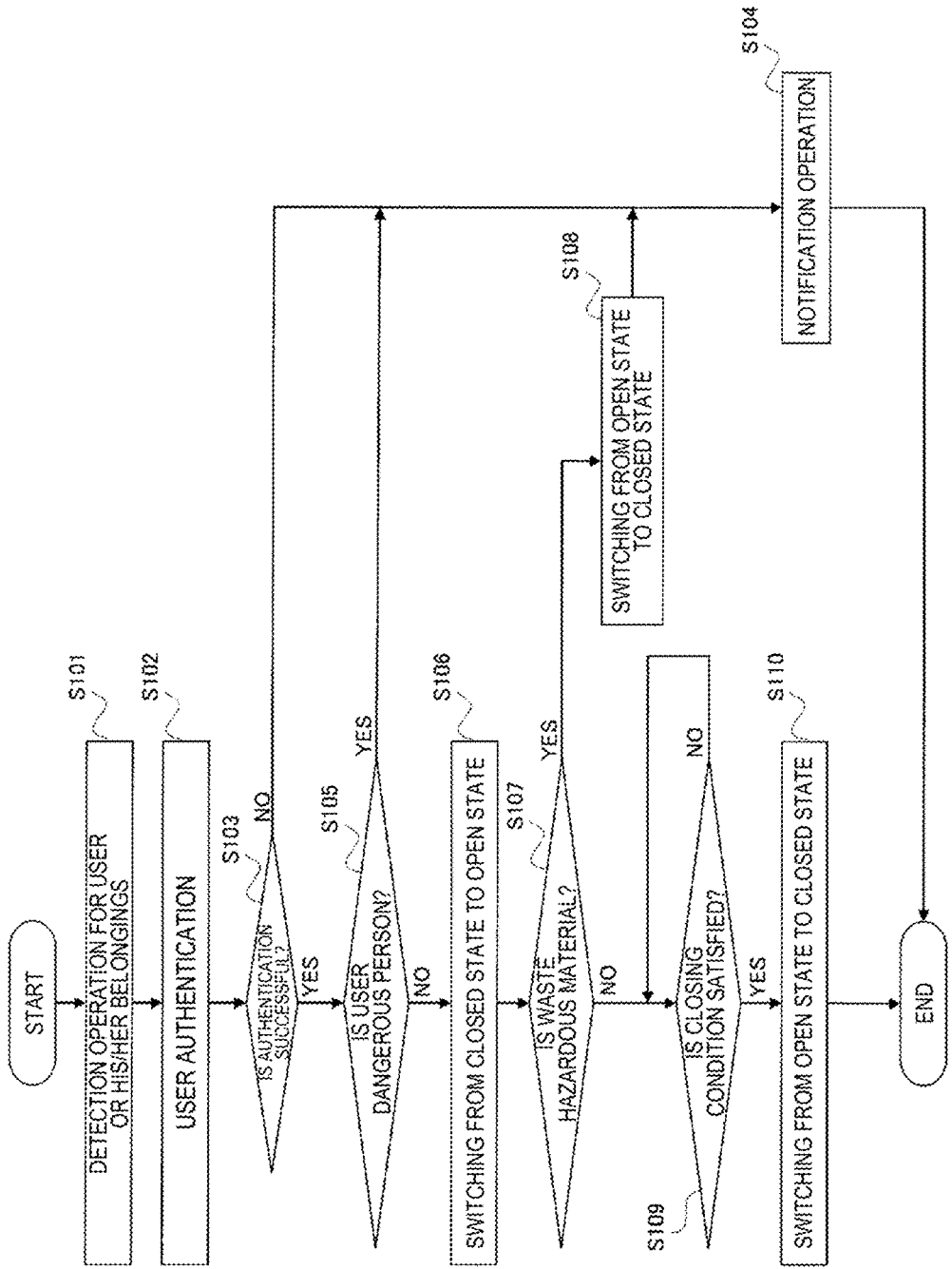
FIG. 12 is a diagram illustrating an operation example 1 of the resource collection apparatus according to the second embodiment.

FIG. 12 is a diagram illustrating an operation example 1 of the resource collection apparatus 100 according to the second embodiment. In the operation example 1, it is assumed that the controller 170 detects a hazardous material after waste is thrown in. At the start of this operation, the opening/closing unit 104 is in the closed state.

As illustrated in FIG. 12, the controller 170 controls the second detector 130 to perform a detection operation for a user or his/her belongings in step S101.

In step S102, the controller 170 performs authentication of the user in cooperation with the server apparatus 200, based on the detection result of the second detector 130. When the user authentication fails (step S103: NO), in step S104, the controller 170 controls the outputter 150 to notify the user that the opening/closing unit 104 is not allowed to be switched to the open state.

When the user authentication is successful (step S103: YES), in step S105, the controller 170 determines whether or not the user is a dangerous person, based on the detection result of the second detector 130 in cooperation with the server apparatus 200. When the user is determined to be a dangerous person (step S105: YES), the controller 170 recognizes the waste discarded by the user as a hazardous material. In step S104, the controller 170 controls the outputter 150 to notify the user that the opening/closing unit 104 is not allowed to be switched to the open state. The controller 170 may control the communicator 140 to transmit a danger notification to the server apparatus 200. The danger notification may include the positional information acquired by the positioner 145 and/or the detection result of the second detector 130 (that is, information for specifying the user).

When the user is determined to be not a dangerous person (step S105: NO), the controller 170 switches the opening/closing unit 104 from the closed state to the open state in step S106. Here, the controller 170 may adjust the opening area of the opening/closing unit 104 according to the size of the waste.

In step 107, the controller 170 determines whether or not the waste stored in the storage space 103 is a hazardous material, based on the detection result of the first detector 120. The controller 170 may determine a degree of danger by combining the detection results of respective apparatuses included in the first detector 120 (the tag reader 121, the explosive detector 122, the temperature sensor 123, the camera 124, the reader 125, and the weight sensor 126). For example, detection of an explosive by the explosive detector 122 may be one condition under which the degree of danger is determined to be "high". Detection of firing (temperature rise) by the temperature sensor 123 may be one condition under which the degree of danger is determined to be "medium".

When the waste stored in the storage space 103 is determined to be a hazardous material (step S107: YES), the controller 170 switches the opening/closing unit 104 from the open state to the closed state in step S108. In step S104, the controller 170 controls the communicator 140 to transmit a danger notification to the server apparatus 200. The danger notification may include at least one selected from the group consisting of the positional information acquired by the positioner 145, the detection result of the first detector 120 (or information indicating the degree of danger based on the detection result of the first detector 120), and the detection result of the second detector 130 (that is, information for specifying the user).

The resource collection apparatus 100 may include an injection mechanism injecting liquid nitrogen into the storage space 103. In that case, in step S108, the controller 170 may control the injection mechanism to inject liquid nitrogen so as to perform cooling with the liquid nitrogen. The resource collection apparatus 100 may include wheels and a motor that enable automatic travel. In that case, in step S108, the resource collection apparatus 100 may automatically move along a predetermined route to, for example, a place with less people.

When the waste stored in the storage space 103 is determined not to be a hazardous material (step S107: NO), in step S109, the controller 170 determines whether or not a closing condition has been satisfied. The closing condition may be a condition that a certain period of time has elapsed after the switching of the opening/closing unit 104 from the closed state to the open state. The closing condition may be a condition that the first detector 120 has detected a new waste. When the closing condition is not satisfied (step S109: NO), the controller 170 keep the opening/closing unit 104 in the open state.

On the other hand, when the closing condition is satisfied (step S109: YES), the controller 170 switches the opening/closing unit 104 from the open state to the closed state in step S110.

FIG. 13 is a diagram illustrating an operation example 2 of the resource collection apparatus 100 according to the second embodiment. In the operation example 2, it is assumed that the controller 170 detects a hazardous material before waste is discarded. At the start of this operation, the opening/closing unit 104 is in the closed state. For the same operations as the operations in the operation example 1, duplicate descriptions will be omitted.

As illustrated in FIG. 13, in step S201, the controller 170 controls the second detector 130 to perform a detection operation for a user or his/her belongings.

In step S202, the controller 170 performs authentication of a user in cooperation with the server apparatus 200, based on the detection result of the second detector 130. When the user authentication fails (step S203: NO), in step S204, the controller 170 controls the outputter 150 to notify the user that the opening/closing unit 104 is not allowed to be switched to the open state.

When the user authentication is successful (step S203: YES), in step S205, the controller 170 determines whether or not the user is a dangerous person, based on the detection result of the second detector 130 in cooperation with the server apparatus 200. When the user is determined to be a dangerous person (step S205: YES), the controller 170 recognizes the waste discarded by the user as a hazardous material. In step S204, the controller 170 controls the outputter 150 to notify the user that the opening/closing unit 104 is not allowed to be switched to the open state. In addition, the controller 170 may control the communicator 140 to transmit a danger notification to the server apparatus 200. The danger notification may include the positional information acquired by the positioner 145 and/or the detection result of the second detector 130 (that is, information for specifying the user).

When the user is determined to be not a dangerous person (step S205: NO), in step S206, the controller 170 controls the first detector 120 to perform a detection operation for waste approaching the opening 102.

In step S207, the controller 170 determines whether or not the waste to be discarded by the user is a hazardous material, based on the detection result of the first detector 120. The controller 170 may determine a degree of danger by combining the detection results of respective apparatuses included in the first detector 120 (the tag reader 121, the explosive detector 122, the temperature sensor 123, the camera 124, the reader 125, and the weight sensor 126).

When the waste to be discarded by the user is determined to be a hazardous material (step S207: YES), in step S204, the controller 170 controls the outputter 150 to notify the user that the opening/closing unit 104 is not allowed to be switched to the open state. The controller 170 controls the communicator 140 to transmit a danger notification to the server apparatus 200. The danger notification may include at least one selected from the group consisting of the positional information acquired by the positioner 145, the detection result of the first detector 120 (or information indicating a degree of danger based on the detection result of the first detector 120), and the detection result of the second detector 130 (that is, information for specifying the user).

On the other hand, when the waste to be discarded by the user is determined not to be a hazardous material (step S207: NO), in step S208, the controller 170 switches the opening/closing unit 104 from the closed state to the open state. Accordingly, the waste determined to be not a hazardous material is put through the opening 102.

In step S209, the controller 170 determines whether or not the closing condition is satisfied. When the closing condition is not satisfied (step S209: NO), the controller 170 keep the opening/closing unit 104 in the open state.

On the other hand, when the closing condition is satisfied (step S209: YES), the controller 170 switches the opening/closing unit 104 from the open state to the closed state in step S210.

Danger Notification Operation

A danger notification operation according to the second embodiment will be described.

Upon receipt of a danger notification from the resource collection apparatus 100, the server apparatus 200 communicating with the resource collection apparatus 100 may determine a degree of danger, and determine destinations of the danger notification destination based on the degree of danger determined.

FIG. 14 is a diagram illustrating the danger notification operation according to the second embodiment.

As illustrated in FIG. 14, a resources collection apparatus 100a detects a hazardous material (step S301). Detecting a hazardous material may be detecting waste that can be a hazardous material.

The resources collection apparatus 100a transmits a danger notification to the server apparatus 200 (step S302). The danger notification may include at least one selected from the group consisting of the positional information acquired by the positioner 145, the detection result of the first detector 120 (or information indicating a degree of danger based on the detection result of the first detector 120), and the detection result of the second detector 130 (that is, information for specifying the user).

The server apparatus 200 determines, based on the danger notification from the resource collection apparatus 100a, at least one selected from the group consisting of the position of the hazardous material, the user who discarded the hazardous material, the degree of danger of the hazardous material, and the type of hazardous material (step S303). The server apparatus 200 may determine (estimate) a range of damage caused by the hazardous material, based on the degree of danger of the hazardous material.

The server apparatus 200 transmits a danger notification including the information received from the resource collection apparatus 100a and the information determined in step S301 to at least one selected from the group consisting of a server apparatus 300, a mobile terminal 400, and the resource collection apparatus 100b (steps S304 to S306). The server apparatus 300, the mobile terminal 400, and the resource collection apparatus 100b display the information notified from the server apparatus 200.

For example, the server apparatus 300 is a server apparatus belonging to an organization such as a security company, police, or an event management company. The mobile terminal 400 is a mobile terminal belonging to a spectator or a player of an event. The mobile terminal 400 may be a terminal apparatus belonging to a resident around an event venue. The resource collection apparatus 100b is a resource collection apparatus placed in the same area (for example, the same event site) as the area where the resource collection apparatus 100a is placed.

Upon receipt of the danger notification from the resource collection apparatus 100, the server apparatus 200 may determine destinations of the danger notification based on the degree of danger. The resource collection apparatus 100a may change the volume of an alarm sound based on the degree of danger. For example, the server apparatus 200 and the resource collection apparatus 100a determine the degree of danger from danger levels 1 to 5 below.

Danger level 1: Extremely unlikely to be a hazardous material (for example, 10% or less)

For example, when tag information can be read from the waste but the image of the waste is inconsistent with the tag information, the waste is classified into Danger 1. In this case, the resource collection apparatus 100a closes the opening/closing unit 104 and issues an alarm. Here, the alarm sound is audible only to the user disposing of the waste (for example, 50 dB).

Danger level 2: Slightly likely to be a hazardous material (for example, more than 10% and 30% or less)

The resource collection apparatus 100a closes the opening/closing unit 104, issues an alarm, and makes a notification to an event management (the server apparatus 300) via the server apparatus 200. Here, the alarm sound is audible only to the user disposing of the waste (for example, 50 dB).

Danger level 3: Likely to be a hazardous material (for example, more than 30% and 50% or less)

The resource collection apparatus 100a closes the opening/closing unit 104, issues an alarm, and makes a notification to the server apparatus 300 of an event management and to the server apparatus 300 of a security company, via the server apparatus 200. Here, the alarm sound is audible to the surroundings of the user disposing of the waste (for example, 70 dB).

Danger level 4: Highly likely to be a hazardous material (for example, more than 50% and 80% or less)

The resource collection apparatus 100a closes the opening/closing unit 104, issues an alarm, and makes a notification to the server apparatus 300 of an event management, to the server apparatus 300 of a security company, and to the server apparatus 300 of police, via the server apparatus 200. Here, the volume of the alarm sound is equivalent to a siren (for example, 100 dB).

Danger level 5: Extremely highly likely to be a hazardous material (for example, more than 80%)

The resource collection apparatus 100a closes the opening/closing unit 104, issues an alarm, and makes a notification to the server apparatus 300 of an event management, the server apparatus 300 of a security company, the server apparatuses 300 of police and a local government, the mobile terminals 400 of residents, and the mobile terminals 400 of spectators, via the server apparatus 200. Here, the volume of the alarm sound is equivalent to a siren (for example, 100 dB).

Other Embodiments

In the first embodiment described above, the language of the information displayed by the display 151 is not particularly mentioned. However, when the nationality of a user can be specified by using the detection result of the second detector 130 performing a detection operation for the user and his/her belongings, the controller 170 of the resource collection apparatus 100 may control the display 151 to display the information in a language according to the nationality of the user.

In the first embodiment described above, an example has been described in which a sorting type is written in the electronic tag 52. The sorting type may be written in the electronic tag 52 at a time when an article 50 to which the electronic tag 52 is attached is sold. For example, a tag writer may be placed at a shop selling the article 50, and a sorting type may be written in the electronic tag 52 at the shop.

In the second embodiment described above, an example has been described in which the resource collection apparatus 100 includes one opening 102. However, as in the case of the example of the outer appearance in the variation 2 according to the first embodiment (FIG. 7), the resource collection apparatus 100 may include a plurality of openings 102 each of which is associated with a sorting type. In that case, the resource collection apparatus 100 includes a plurality of openings 102 each of which is associated with a sorting type, and a plurality of opening/closing units 104 including the opening/closing unit 104 individually provided to each of the plurality of openings 102. As in the case of another example of the outer appearance in the variation 2 according to the first embodiment (FIG. 8), at least one selected from the group consisting of the first detector 120, the second detector 130, and the display 151 may be shared by the plurality of openings 102. In that case, one first detector 120, one second detector 130, and one display 151 are provided for the three openings 102 in the resource collection apparatus 100.

A program may be provided that causes a computer to execute each of the processing operations according to the first and second embodiments and the variations thereof described above. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

The first and second embodiments have been described above in detail with reference to the drawings; however, specific configurations are not limited to those described above, and various design modifications or the like can be made without departing from the gist of the present disclosure.

Note that the UN Summit held in September, 2015 adopted "Sustainable Development Goals (SDGs)" as 17 international goals. Among the 17 SDGs, the resource collection apparatuses, the resource collection systems, the control methods according to the first and second embodiments can contribute to the achievement of the goals of "7. Affordable and Clean Energy", "9. Industry, Innovation and Infrastructure", "11. Sustainable Cities and Communities", "12. Responsible Consumption and Production", and the like.

The invention claimed is:

1. A resource collection apparatus for collecting wastes to be reused as a resource, the resource collection apparatus comprising:
an opening associated with a predetermined sorting type;
an opening/closing unit configured to open and close the opening, wherein the opening/closing unit includes
a lid configured to cover the opening, and
an actuator configured to control the lid to open and close the opening;
a first detector configured to perform an operation to detect a target waste belonging to a user; and
a controller configured to:
specify a first sorting type of the target waste using a result detected with the first detector; and
in response to the first sorting type being specified as the predetermined sorting type of the opening, switch the opening/closing unit from a closed state to an open state, wherein
the controller is further configured to:
identify or estimate a size of the target waste using the result detected with the first detector; and
adjust an opening area of the opening in the open state, by turning the lid with the actuator, based on the size of the target waste, the size being specified or estimated using the result detected with the first detector.

2. The resource collection apparatus according to claim 1, wherein
the first detector includes at least one selected from the group consisting of:
a tag reader configured to read information from an electronic tag attached to the target waste;
a camera configured to capture an image of the target waste; and
a code reader configured to read a barcode or a two-dimensional code, attached to the target waste.

3. The resource collection apparatus according to claim 1, further comprising:
a communicator configured to communicate with a server apparatus; and
a second detector configured to perform (i) an operation to detect the user or (ii) an operation to detect belongings of the user other than the target waste, wherein
the controller is further configured to, in response to a second sorting type, which is specified from purchase history information of a commercial product purchased by the user, matching the predetermined sorting type of the opening, switch the opening/closing unit from the closed state to the open state based on a detection result of the second detector.

4. The resource collection apparatus according to claim 3, wherein
the second detector includes at least one selected from the group consisting of:
a camera configured to capture an image of the user;
a code reader configured to read a barcode or a two-dimensional code attached to the belongings; and
a communication interface configured to communicate with the belongings.

5. The resource collection apparatus according to claim 3, wherein
the resource collection apparatus is placed in an area where an event is held or a region surrounding the area, and
the belongings include a ticket that belongs to a participant of the event.

6. The resource collection apparatus according to claim 3, wherein
the controller is configured to, in response to at least one of the first sorting type or the second sorting type matching the predetermined sorting type of the opening, switch the opening/closing unit from the closed state to the open state.

7. The resource collection apparatus according to claim 6, wherein
the controller is configured to, in response to both of the first sorting type and the second sorting type matching the predetermined sorting type of the opening, switch the opening/closing unit from the closed state to the open state.

8. The resource collection apparatus according to claim 6, wherein
the controller is configured to, in response to failing to specify the first sorting type using the result detected with the first detector, control the opening/closing unit based on the second sorting type specified using the purchase history information.

9. The resource collection apparatus according to claim 1, wherein
the controller is configured to, in response to a closing condition being satisfied after the opening/closing unit is switched from the closed state to the open state, switch the opening/closing unit from the open state to the closed state, and
the closing condition includes at least one of
a condition that the target waste has been put through the opening, or
a condition that a certain time period has elapsed after the opening/closing unit is switched from the closed state to the open state.

10. The resource collection apparatus according to claim 1, further comprising:
a plurality of openings including the opening, each of the plurality of openings being associated with a corresponding sorting type; and
a plurality of opening/closing units including the opening/closing unit, each of the plurality of opening/closing units being provided to a corresponding opening of the plurality of openings, wherein
the controller is configured to, in response to the first sorting type specified using the result detected with the first detector matching a sorting type associated with one opening of the plurality of openings, switch the opening/closing unit provided to the one opening from the closed state to the open state.

11. The resource collection apparatus according to claim 10, wherein
the controller is configured to, in response to the first detector detecting a plurality of kinds of waste that is to be sorted into different sorting types, determine an order of switching the plurality of opening/closing units from the closed state to the open state, based on a sorting type of each of the plurality of kinds of wastes.

12. The resource collection apparatus according to claim 1, wherein
the lid includes a shutter wound on one end side of the opening in the open state, and
the controller is further configured to adjust the opening area of the opening in the open state, by turning a wound portion of the shutter with the actuator, based on the size of the target waste.

13. The resource collection apparatus according to claim 12, wherein
the controller is configured to, in the open state, adjust the opening area of the opening in a range from at least one partially open state to a fully open state, wherein
in the closed state, an entirety of the opening is covered by the shutter,
in the fully open state, the entirety of the opening is exposed, and
in the at least one partially open state, a part of the opening is covered by the shutter, the opening area of the opening in the at least one partially open state being less than that in the fully open state.

14. A control method for a resource collection apparatus for collecting wastes to be reused as a resource, wherein
the resource collection apparatus comprises
an opening associated with a predetermined sorting type;
an opening/closing unit configured to open and close the opening, wherein the opening/closing unit includes
a lid configured to cover the opening, and
an actuator configured to control the lid to open and close the opening;
a first detector configured to perform an operation to detect a target waste belonging to a user; and
a controller;
the control method comprising:
performing a detection operation, through the first detector, for a target waste belonging to a user;
specifying, through the controller, a first sorting type of the target waste is to be sorted, by using a result of the detection operation; and
opening and closing, through the controller, the opening associated with the predetermined sorting type, wherein
the opening and closing includes, in response to the first sorting type being specified as the predetermined sorting type of the opening, switching the opening/closing unit from a closed state to an open state, and
the opening and closing further includes
identifying or estimating a size of the target waste using the result detected with the first detector, and
adjusting an opening area of the opening in the open state, by turning the lid with the actuator, based on the size of the target waste, the size being specified or estimated using the result detected with the first detector.

15. The control method according to claim 14, wherein
the lid includes a shutter wound on one end side of the opening in the open state, and
in the opening and closing, the controller adjusts the opening area of the opening in the open state by turning a wound portion of the shutter with the actuator, based on the size of the target waste.

16. The control method according to claim 15, wherein
in the opening and closing, in the open state, the controller adjusts the opening area of the opening in a range from at least one partially open state to a fully open state, wherein
in the closed state, an entirety of the opening is covered by the shutter,
in the fully open state, the entirety of the opening is exposed, and
in the at least one partially open state, a part of the opening is covered by the shutter, the opening area of the opening in the at least one partially open state being less than that in the fully open state.

17. The control method according to claim 14, wherein
in the opening and closing, in response to the second sorting type specified from purchase history information of a commercial product purchased by the user matching the predetermined sorting type of the opening, the controller switches the opening/closing unit from the closed state to the open state based on a detection result of a second detector of the resource collection apparatus, and
the second detector performs (i) an operation to detect the user or (ii) an operation to detect belongings of the user other than the target waste.

18. The control method according to claim 17, wherein
in the opening and closing, in response to at least one of
the first sorting type or the second sorting type matching the predetermined sorting type of the opening, the
controller switches the opening/closing unit from the
closed state to the open state.

19. The control method according to claim 18, wherein
in the opening and closing, in response to both of the first
sorting type and the second sorting type matching the
predetermined sorting type of the opening, the controller switches the opening/closing unit from the closed
state to the open state.

\* \* \* \* \*